US012637890B2

(12) United States Patent
Eskilsson

(10) Patent No.: US 12,637,890 B2
(45) Date of Patent: May 26, 2026

(54) SLIDING CLOSET DOOR ASSEMBLY AND BYPASS DOOR ASSEMBLY

(71) Applicant: Inter IKEA Systems B.V., LN Delft (NL)

(72) Inventor: Tomas Eskilsson, Hamneda (SE)

(73) Assignee: Inter IKEA Systems B.V., LN Delft (NL)

( * ) Notice: Subject to any disclaimer, the term of this patent is extended or adjusted under 35 U.S.C. 154(b) by 0 days.

(21) Appl. No.: 17/921,771

(22) PCT Filed: May 4, 2021

(86) PCT No.: PCT/SE2021/050413

§ 371 (c)(1),
(2) Date: Oct. 27, 2022

(87) PCT Pub. No.: WO2021/225502

PCT Pub. Date: Nov. 11, 2021

(65) Prior Publication Data

US 2023/0167665 A1 Jun. 1, 2023

(30) Foreign Application Priority Data

May 4, 2020 (SE) .................................... 2050504-6

(51) Int. Cl.
*E05F 5/00* (2017.01)
*E05D 13/00* (2006.01)
(Continued)

(52) U.S. Cl.
CPC .............. *E05F 5/003* (2013.01); *E05D 13/12* (2013.01); *E05D 15/063* (2013.01);
(Continued)

(58) Field of Classification Search
CPC .. E05F 5/003; E05F 1/16; E05F 3/225; E05D 13/12; E05D 15/063; E05D 2015/487;
(Continued)

(56) References Cited

U.S. PATENT DOCUMENTS 809,696 A 1/1906 Keil
2,940,112 A * 6/1960 Riser .................. E05D 15/0634 16/105

(Continued)

FOREIGN PATENT DOCUMENTS

CN 202596462 U 12/2012
CN 103452413 A 12/2013

(Continued)

OTHER PUBLICATIONS

PCT International Search Report for PCT Application No. PCT/SE2021/050413 mailed Aug. 27, 2021 (6 pages).

(Continued)

*Primary Examiner* — Jason W San
*Assistant Examiner* — Matthew J Sullivan
(74) *Attorney, Agent, or Firm* — Merchant & Gould P.C.

(57) ABSTRACT

A sliding closet door leaf is provided with a shuttle connector (40*a*) configured to connect the door leaf to a soft closing mechanism shuttle (60*a*) arranged in a door guide, and the soft closing mechanism shuttle (60*a*) comprises a door leaf connector (62*a*) configured engage with the shuttle connector (40*a*), wherein the shuttle connector (40*a*) is connectable to the door leaf connector (62*a*) at anyone of at least a first mutual vertical relationship between the door leaf and the soft closing mechanism shuttle (60*a*), and a second mutual vertical relationship between the door leaf and the soft closing mechanism shuttle (60*a*).

17 Claims, 18 Drawing Sheets

(51) Int. Cl.
*E05D 15/06* (2006.01)
*E05D 15/48* (2006.01)

(52) U.S. Cl.
CPC ... *E05D 2015/487* (2013.01); *E05Y 2201/412* (2013.01); *E05Y 2600/56* (2013.01); *E05Y 2900/20* (2013.01)

(58) Field of Classification Search
CPC ............ E05D 15/0634; E05D 15/0647; E05D 15/0652; E05Y 2900/132; E05Y 2900/20; E05Y 2201/412
See application file for complete search history.

(56) References Cited

U.S. PATENT DOCUMENTS

| | | | | |
|---|---|---|---|---|
| 3,670,357 | A * | 6/1972 | Steigerwald | E05D 15/0669 16/105 |
| 3,829,930 | A * | 8/1974 | McNinch | E05D 15/0634 49/420 |
| 3,959,849 | A * | 6/1976 | Marquardt | E05D 15/0665 49/420 |
| 3,996,643 | A * | 12/1976 | Steigerwald | E05D 15/0669 16/99 |
| 4,486,980 | A * | 12/1984 | O'Bar | E05D 13/04 49/213 |
| 4,594,812 | A * | 6/1986 | Clancy | E06B 3/4618 49/404 |
| 4,769,949 | A * | 9/1988 | Glendowne | A47K 3/34 4/557 |
| 5,280,686 | A * | 1/1994 | Davies | E05D 15/1042 49/404 |
| 5,575,022 | A * | 11/1996 | Duffy | A47K 3/34 4/557 |
| 5,839,228 | A * | 11/1998 | Duffy | A47K 3/34 49/222 |
| 5,845,363 | A * | 12/1998 | Brempell | E05D 15/0669 16/99 |
| 6,148,451 | A * | 11/2000 | DeBraal | A47K 3/34 4/557 |
| 6,381,904 | B1 * | 5/2002 | Tedescucci | A47K 3/34 49/413 |
| 6,418,588 | B1 * | 7/2002 | Haab | E05D 15/063 49/409 |
| 6,845,849 | B2 * | 1/2005 | Bass | E05D 15/0634 187/334 |
| 8,240,089 | B2 * | 8/2012 | Lambertini | E05D 15/565 49/226 |
| 8,322,076 | B2 * | 12/2012 | Isaacs | E05D 15/0682 16/105 |
| 8,950,041 | B2 * | 2/2015 | Palsson | E05D 15/063 16/105 |
| 9,009,918 | B2 * | 4/2015 | Haab | E05D 15/0634 16/72 |
| 9,068,385 | B2 * | 6/2015 | Proctor | E05D 15/063 |
| 9,080,359 | B2 * | 7/2015 | Horwood | E05D 15/0669 |
| 9,085,924 | B2 * | 7/2015 | Tidwell | E05D 15/0669 |
| 9,486,114 | B2 * | 11/2016 | Ball | A47K 3/00 |
| 9,605,461 | B2 * | 3/2017 | Zimmer | E05D 15/0669 |
| 9,834,972 | B2 * | 12/2017 | Xu | E05F 5/003 |
| 9,863,177 | B2 * | 1/2018 | Zimmer | E06B 3/4636 |
| 9,879,459 | B2 * | 1/2018 | Zimmer | F16C 41/001 |
| 10,145,166 | B2 * | 12/2018 | Berger | E05D 15/10 |
| 10,513,876 | B2 * | 12/2019 | Molloy | E05F 1/16 |
| 10,711,497 | B2 * | 7/2020 | Lang | E06B 3/46 |
| 10,711,499 | B2 * | 7/2020 | Walz | E05F 5/003 |
| 10,738,521 | B2 * | 8/2020 | Hamilton | E05D 15/0669 |
| 11,242,704 | B2 * | 2/2022 | Girotto | E05D 15/08 |
| 11,274,480 | B2 * | 3/2022 | Minter | E05D 15/0669 |
| 11,421,461 | B2 * | 8/2022 | Martin | E05F 3/227 |
| 11,459,807 | B2 * | 10/2022 | Sato | A47B 88/477 |
| 11,466,495 | B2 * | 10/2022 | Veilleux | E05F 5/003 |
| 11,781,355 | B1 * | 10/2023 | Lammers | E05D 15/0634 16/105 |
| 11,781,361 | B2 * | 10/2023 | Terno | E05F 5/027 16/49 |
| 11,788,334 | B2 * | 10/2023 | Bonomi | E05D 15/0686 49/452 |
| 11,891,847 | B2 * | 2/2024 | Racicot | E05D 15/0634 |
| 11,993,967 | B2 * | 5/2024 | Scorcia | E05D 15/0669 |
| 12,123,249 | B2 * | 10/2024 | Hamm | E06B 3/02 |
| 2001/0010426 | A1 | 8/2001 | Migli | |
| 2005/0011041 | A1 * | 1/2005 | Ness | E05D 15/0669 16/105 |
| 2007/0017065 | A1 * | 1/2007 | Hutnik | E05D 15/0669 16/91 |
| 2010/0123378 | A1 * | 5/2010 | Chen | A47B 88/467 312/333 |
| 2010/0205772 | A1 * | 8/2010 | Haab | E05D 15/0639 16/91 |
| 2011/0068671 | A1 | 3/2011 | Vanini | |
| 2013/0091665 | A1 * | 4/2013 | Tsai | E05F 5/003 16/49 |
| 2013/0199099 | A1 * | 8/2013 | Ryden | E05F 5/003 49/449 |
| 2016/0076293 | A1 * | 3/2016 | Halfon | E05D 15/0652 16/90 |
| 2016/0138316 | A1 * | 5/2016 | Finke | F16M 13/02 49/506 |
| 2018/0223579 | A1 | 8/2018 | Walz | |
| 2019/0374047 | A1 | 12/2019 | Nishiyama et al. | |
| 2022/0333420 | A1 * | 10/2022 | Willis | E05F 5/003 |
| 2022/0396987 | A1 * | 12/2022 | Wei | E05D 15/0634 |
| 2023/0039186 | A1 * | 2/2023 | Hooke | E05D 15/0665 |
| 2023/0088843 | A1 * | 3/2023 | Oakes | E05D 15/0639 49/103 |
| 2023/0160247 | A1 * | 5/2023 | Eskilsson | E06B 3/721 16/97 |
| 2023/0193677 | A1 * | 6/2023 | Krebs | E05D 15/0669 16/99 |
| 2023/0332451 | A1 * | 10/2023 | Eskilsson | E05D 15/0691 |

FOREIGN PATENT DOCUMENTS

| | | | |
|---|---|---|---|
| CN | 105401844 | B | 5/2017 |
| CN | 115485447 | A | 12/2022 |
| EP | 2128368 | A1 | 12/2009 |
| FR | 2898931 | A1 | 9/2007 |
| GB | 2360812 | A | 10/2001 |
| WO | 2012/156338 | A1 | 11/2012 |
| WO | 2015121272 | A1 | 8/2015 |
| WO | 2016/180783 | A1 | 11/2016 |
| WO | 2017/055340 | A1 | 4/2017 |
| WO | 2019/021100 | A1 | 1/2019 |

OTHER PUBLICATIONS

PCT Written Opinion for PCT Application No. PCT/SE2021/050413 mailed Aug. 27, 2021 (5 pages).

Office Action dated Apr. 27, 2025 for corresponding Chinese Application No. 202180032371.6 (23 pgs including English Translation).

* cited by examiner

SLIDING CLOSET DOOR ASSEMBLY AND BYPASS DOOR ASSEMBLY

This application is a National Stage Application of PCT/SE2021/050413, filed 4 May 2021, which claims benefit of Serial No. 2050504-6, filed 4 May 2020 in Sweden, and which applications are hereby incorporated by reference in their entireties. To the extent appropriate, a claim of priority is made to each of the above disclosed applications.

FIELD OF THE INVENTION

The present invention relates to a sliding closet door assembly and to a bypass door assembly.

BACKGROUND

US 2018/0223579 discloses a soft closing arrangement for damping the closing of a door leaf. There is however a need for a more versatile soft closing arrangement which can be used for a greater range of situations. There is also a need for a sliding closet door assembly which is inexpensive, easy to assemble, and safe.

SUMMARY

It is an object of the present invention to solve, or at least mitigate, parts or all of the above mentioned problems. To this end, there is provided a sliding closet door assembly comprising a door leaf assembly configured to define a door leaf extending in a vertical door plane; and a door guide assembly configured to define a first door guide for guiding the door leaf between a first position and a second position along a horizontal guide axis along the door plane; and a soft closing mechanism shuttle which is connectable to the door leaf to move with the door leaf between said first and second positions, guided by said first door guide, and to gradually brake the motion of the door leaf when approaching said first position, wherein the door leaf assembly comprises a shuttle connector configured to connect the door leaf to the soft closing mechanism shuttle, and the soft closing mechanism shuttle comprises a door leaf connector configured engage with the shuttle connector of the door leaf assembly, characterized in that the shuttle connector is connectable to the door leaf connector at anyone of at least a first mutual vertical relationship between the door leaf and the soft closing mechanism shuttle, and a second mutual vertical relationship between the door leaf and the soft closing mechanism shuttle. Such an arrangement facilitates assembling the sliding closet door assembly in different environments. By way of example, such a soft closing arrangement is suitable for deployment at either the top edge or the bottom edge of a sliding door, which may reduce the number of different articles that need to be manufactured for different situations and applications. Enabling the respective connector interfaces of the door leaf and the soft closing mechanism to be interconnected such that at least two different vertical relationships between the door leaf and soft closing mechanism shuttle can be obtained facilitates adjusting the vertical position of the door leaf in relation to said first door guide during installation. Moreover, manufacturing tolerances of the sliding closet door assembly may be relaxed. Each of the first and second positions along the guide axis may be fixed in relation to a frame, such as a designated closet frame or a frame defined by the floor, wall or ceiling of a room in which the sliding closet door is mounted. Alternatively, one or both of the first and second positions may be fixed in relation to a second door leaf of a sliding door arrangement comprising more than one sliding door, such as a bypass door arrangement, for example in the manner described in US 2018/0223579. According to an embodiment, the shuttle connector may be configured to be positioned adjacent to a first side edge of the door leaf, said first side edge facing said first position.

According to embodiments, the shuttle connector may be at a first vertical position when the door leaf and the soft closing mechanism shuttle are in said first mutual vertical relationship, and at a second vertical position when the door leaf and the soft closing mechanism shuttle are in said second mutual vertical relationship. Expressed differently, the soft closing mechanism shuttle may be locked to a fixed vertical position within the door guide, whereas the shuttle connector may assume different vertical positions to accommodate for an adjustment range for the vertical position of the door leaf.

A vertical distance between said first and second vertical positions may, by way of example, exceed 3 mm. Such a range may be suitable for facilitating moderate adjustments of the vertical position of the door leaf. However, according to an embodiment, said vertical distance may exceed 5 mm, thereby permitting greater freedom.

According to embodiments, the shuttle connector may be connectable to the door leaf connector at any mutual vertical relationship in a continuous range between said first mutual vertical relationship and said second mutual vertical relationship. Such an arrangement provides even greater possibilities of vertically adjusting the door leaf position.

According to embodiments, the shuttle connector may be configured to be snap-fit to the door leaf connector.

According to embodiments, a snap arrangement of one of the shuttle connector and the door leaf connector may be configured to, when the shuttle connector and the door leaf connector are pressed together, be deflected only in a horizontal direction by the other of the shuttle connector and the door leaf connector, the snap-fit thereby permitting a vertical play between the shuttle connector and the door leaf connector. For example, one of the shuttle connector and the door leaf connector may snap onto a vertical post of the other of the shuttle connector and the door leaf connector, the vertical post allowing, the shuttle connector and the door leaf connector have snapped together, said one of the shuttle connector and the door leaf connector to slide vertically along the vertical post. According to embodiments, said snap arrangement of said one of the shuttle connector and the door leaf connector may be configured to, when the shuttle connector and the door leaf connector are pressed together, be deflected only in a direction along the guide axis.

According to embodiments, the shuttle connector and the door leaf connector may be configured to define, when connected, a guide support interface which is rigid in a direction of the guide axis.

According to embodiments, the shuttle connector may comprise a door leaf mounting flange configured to be attached to a face of the door leaf extending along the door plane, and a connector tongue extending substantially perpendicularly from the door leaf mounting flange. The door leaf mounting flange may be configured to be adjustably attached to the door leaf, e.g. via screw holes having an elongate shape extending vertically along the door plane. Thereby, additional adjustability may be obtained.

According to embodiments, the door leaf connector may comprise two connector interfaces facing in opposite directions. Thereby, the same soft closing mechanism shuttle may be used for arranging a soft closing mechanism in either of said first and second ends, by turning the soft closing mechanism shuttle 180 degrees. This reduces the number of different parts needed for forming different sliding closet door assemblies, as well as reduces the risk of mistakes when assembling the sliding closet door assembly.

According to embodiments, said first door guide may be a bottom guide configured to guide a bottom edge of the door leaf. The door guide assembly may further comprise a top guide for guiding a top edge of the door leaf. According to embodiments, the door leaf may be suspended in the top guide, such that the top guide carries the weight of the door leaf.

According to embodiments, said first door guide may be a top guide configured to guide a top edge of the door leaf. The door guide assembly may further comprise a bottom guide for guiding a bottom edge of the door leaf. According to embodiments, the door leaf may be vertically supported in the bottom guide, such that the top guide does not carry any substantial vertical load. Such an arrangement may be particularly suitable in a floor-to-ceiling sliding door arrangement, where bottom and top guides may be attached to the floor and ceiling, respectively, of a room.

According to embodiments, said first door guide may comprise a brake activator adjacent to said first position, and said soft closing mechanism shuttle may comprise an activator catcher configured to, when reaching the brake activator, engage with the brake activator to brake the door leaf.

According to embodiments, the activator catcher may be movable relative to the door leaf connector along the guide axis.

According to embodiments, the activator catcher may be movable against a brake bias relative to the door leaf connector.

According to embodiments, the brake bias may be generated by a damper. A damper may assist in obtaining a soft and controlled deceleration of the door when reaching said first position. The damper may also assist in obtaining a soft and controlled acceleration of the door when opening the door again.

According to embodiments, the activator catcher may be configured to lock to the brake activator, and the activator catcher may be resiliently biased relative to the door leaf connector along the guide axis to, once locked to the brake activator, bias the door leaf towards said first position. The resilient bias may thereby assist in bringing the door leaf to a firm and precisely determined position, for example a completely closed position, and maintain it there. According to embodiments, the resilient bias may be generated by a spring, such as a coil spring, operably connected between the activator catcher and the door leaf connector. According to an example, the resilient bias may draw the activator catcher in a direction away from the door leaf connector.

According to embodiments, said first door guide may comprise a guide track opening facing in a horizontal direction perpendicular to the guide axis, wherein the shuttle connector is connectable to the door leaf connector via the guide track opening. Such a configuration provides for an easy connection in the horizontal direction, e.g. by pivoting the door about a top edge of the door leaf to connect shuttle and door leaf connectors at a bottom edge of the door leaf. By way of example, the guide track opening may face towards the outside of the closet.

According to embodiments, said soft closing mechanism shuttle may be pre-mounted in said first door guide. According to an embodiment, the soft closing mechanism shuttle may be firmly held at a pre-mounting position in which an activator catcher of said soft closing mechanism shuttle is locked to a brake activator of said first door guide.

According to embodiments, said soft closing mechanism shuttle may be a first soft closing mechanism shuttle and said shuttle connector may be a first shuttle connector, wherein the sliding closet door assembly further comprises a second soft closing mechanism shuttle which is connectable to the door leaf to move with the door leaf between said first and second positions, the second soft closing mechanism shuttle being configured to be guided by said first door guide, and to gradually brake the motion of the door leaf when approaching said second position, wherein the door leaf assembly further comprises a second shuttle connector configured to connect the door leaf to the second soft closing mechanism shuttle, and the second soft closing mechanism shuttle comprises a respective door leaf connector configured engage with the second shuttle connector of the door leaf assembly. The second soft closing mechanism shuttle and the second shuttle connector may be configured in accordance with the first soft closing mechanism shuttle and the first shuttle connector as defined in any of the above embodiments. In particular, the second shuttle connector may be connectable to the door leaf connector of the second soft closing mechanism shuttle at anyone of at least a first mutual vertical relationship between the door leaf and the second soft closing mechanism shuttle, and a second mutual vertical relationship between the door leaf and the second soft closing mechanism shuttle.

According to a second aspect, parts or all of the above mentioned problems are solved, or at least mitigated, by a bypass door assembly comprising two sliding closet door assemblies as defined hereinabove.

According to a third aspect, parts or all of the above mentioned problems are solved, or at least mitigated, by a method of connecting a sliding door to a frame, such as a closet frame or a frame defined by the floor, walls and/or ceiling of a room in which the sliding door is to be mounted, the method comprising: suspending the door in a top guide; attaching the door to a soft closing mechanism shuttle guided by a bottom guide; and adjusting a vertical position of the door within a vertical adjustment range permitted by a vertical play in a connection interface between the door and the soft closing mechanism shuttle. The vertical position of the door may be adjusted prior to and/or after having connected the door to the soft closing mechanism shuttle.

According to a fourth aspect, parts or all of the above mentioned problems are solved, or at least mitigated, by a sliding closet door assembly comprising a door leaf assembly configured to define a door leaf extending in a vertical door plane, the door leaf assembly comprising a pair of top riders which are connectable to a top guide; and a door guide assembly comprising a top guide for guiding a top edge of the door leaf between a first position and a second position along a horizontal guide axis along the door plane, wherein the top riders comprise a snap arrangement configured to snap to the top guide via a pivotal motion of the door leaf in a lock direction about a horizontal pivot axis, thereby locking the door leaf to the top guide in such a manner that translation of the top edge of the door leaf in a direction transversal to the door plane is prevented. Such an arrangement is easy to assemble, while preventing the door leaf from accidentally disconnecting from the top guide.

According to embodiments, the snap arrangement may be configured to snap free from the top guide, to be released therefrom, by pivoting the door leaf in a release direction about the pivot axis, the release direction being opposite to the lock direction.

According to embodiments, each of said top riders may comprise a respective guide wheel configured to ride along guide track in the top guide, wherein the pivot axis coincides with a line of engagement between the guide wheels and the guide track.

According to embodiments, the snap arrangement may comprise a hook configured to be pressed against and resiliently displaced by a lock portion of the top guide during said pivotal motion of the door leaf about the horizontal pivot axis, and to snap back to a relaxed state after having passed said lock portion to provide said snap function. This may provide a simple and reliable snap function in the lock direction, the release direction, or both. As an alternative or addition thereto, the lock portion of the top guide may be configured to resiliently yield when the hook presses thereupon, to provide said snap function.

According to embodiments, said hook may be configured to be resiliently displaced by the lock portion by resilient deformation of the hook itself. This provides a particularly simple and efficient snap function.

It is noted that embodiments of the invention may be embodied by all possible combinations of features recited in the claims. Further, it will be appreciated that all embodiments of the closet door assembly according to the fourth aspect are combinable with all embodiments of the closet door assembly according to the first embodiment. Moreover, the various embodiments described hereinabove for the devices of the first, second and fourth aspects are all combinable with the method as defined in accordance with the third aspect, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, whereas other parts may be omitted.

DETAILED DESCRIPTION OF THE EXEMPLARY EMBODIMENTS

Figure 1:
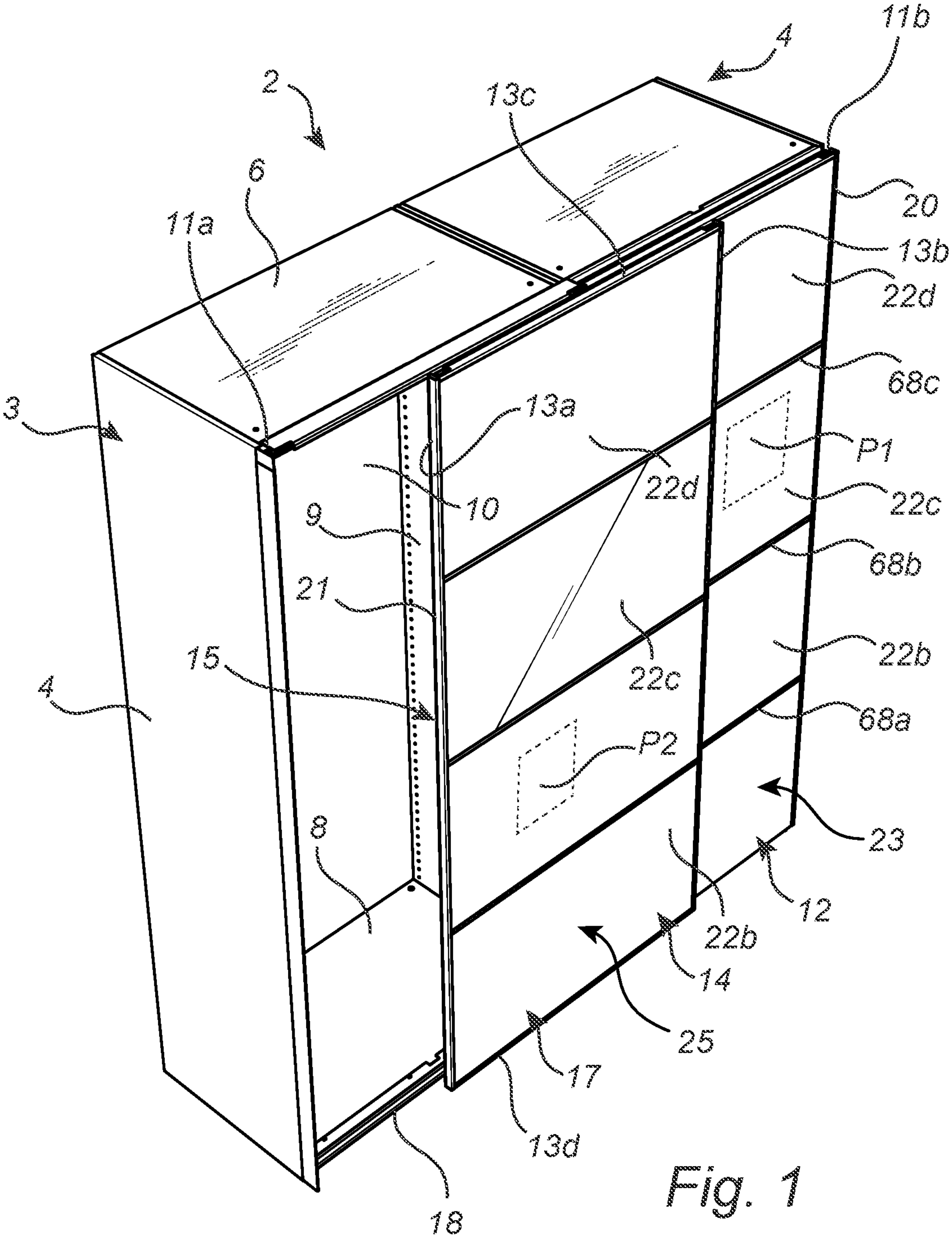
FIG. 1 is a view in perspective of a closet with sliding doors.

FIG. 1 illustrates a closet 2 comprising a closet frame 3 defined by a pair of parallel outer side walls 4, a top wall 6, a floor 8, a divider wall 9 parallel to the side walls 4, and a back wall 10. The top wall 6 is formed by a pair of adjacent, coplanar top panels, and the floor 8 is formed by a pair of adjacent, coplanar floor panels, only one of which is visible in the view of FIG. 1. The closet further comprises a bypass door arrangement comprising an inner sliding door 12 and an outer sliding door 14, which are movable relative to the closet frame 3. The inner sliding door 12 is guidedly suspended in a top guide 16, configured as a guide rail attached to a top portion the closet frame 3, to enable movement along an inner door plane P1 of the inner sliding door 12 between a first end position 11*a* and a second end position 11*b*. Each of the sliding doors 12, 14 has a first side edge 13*a* facing the first end position 11*a*, a second side edge facing the second end position 11*b*, a top edge 13*c*, and a bottom edge 13*d*. The inner sliding door 12 is also guided in a bottom guide 18, which is configured as a guide rail attached to a bottom portion of the closet frame 3. Likewise, the outer sliding door 12 is guidedly suspended in the top guide 16, and is guided by the bottom guide 18, to enable movement along an outer door plane P2 of the outer sliding door 14 between the first end position 11*a* and the second end position 11*b*.

The inner sliding door 12 comprises an inner door frame 20 and a plurality of door panels, the plurality of door panels comprising a first door panel 22*a*, a second door panel 22*b*, a third door panel 22*c*, and a fourth door panel 22*d*. Together, the inner door frame 20 and the door panels 22*a-d* define an inner door leaf 23, the constituents of which define an inner door leaf assembly. It will be appreciated, though, that the inner door leaf 23 may just as well be made of a door leaf assembly comprising only a single coherent panel, such that the inner door leaf 23 is made in a single piece. However, in the illustrated embodiment, the door panels 22*a-d* may be different from each other. By way of example, they may be painted in different colours, and/or be made of different materials, such as wood, glass, plastic, etc. They may also have different thicknesses. A typical exemplary thickness of the door panels 22*a-d* may be between 2 mm and 4 mm. Similar to the inner sliding door 12, also the outer sliding door 14 comprises an outer door frame 21 and a plurality of door panels 22*a-d*, which together define an outer door leaf 25. Each of the doors 12, 14 has a respective inside face 15 facing the interior of the closet, and an opposite outside face 17 facing an exterior space.

Figure 2:
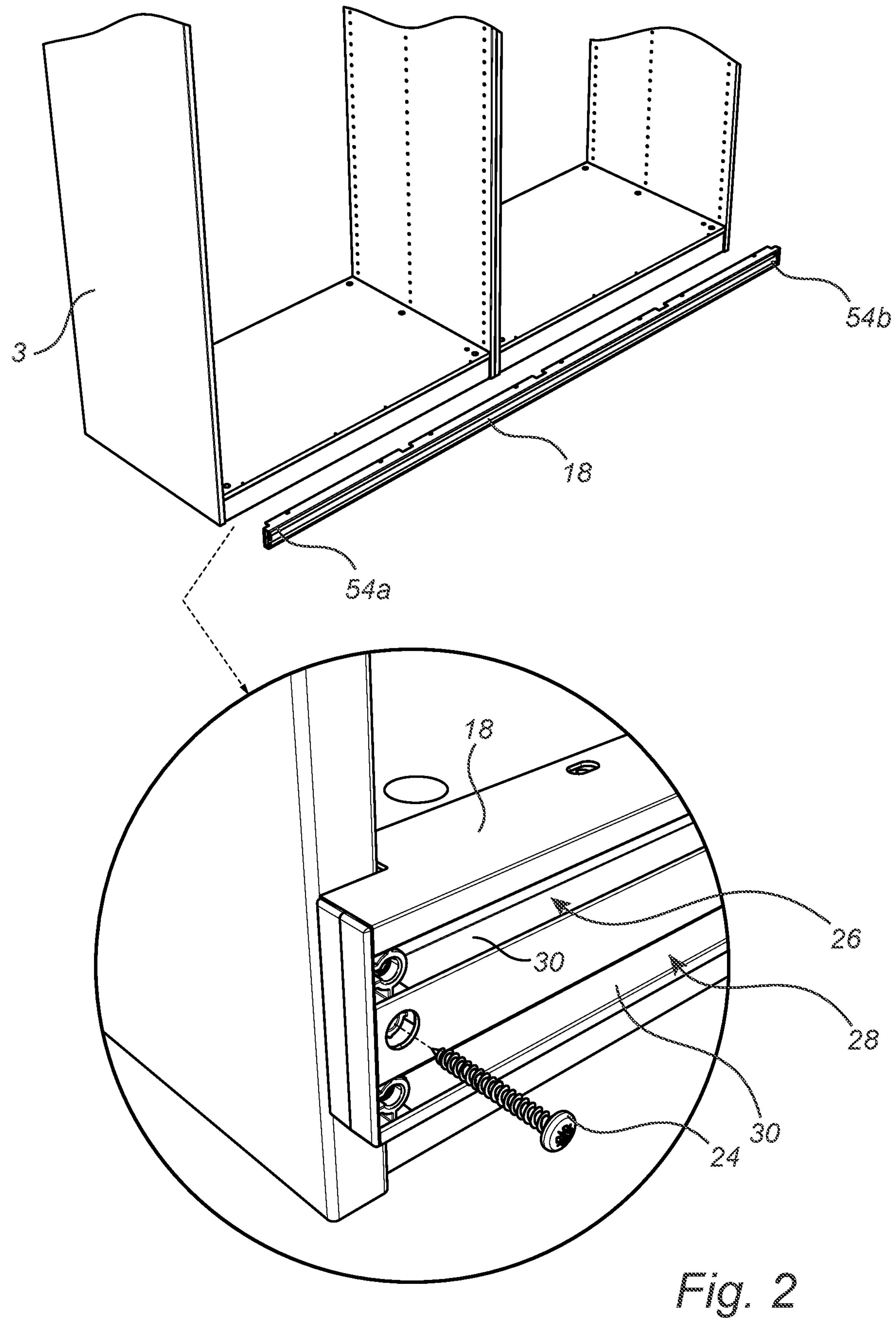
FIG. 2 is a view in perspective of a lower portion of a closet frame of the closet of FIG. 1, along with a bottom guide configured to guide lower ends of the sliding doors of FIG. 1, wherein a magnified view of a portion of FIG. 2 illustrates the bottom guide after having been attached to the closet frame.

FIG. 2 illustrates the bottom guide 18 in greater detail. The bottom guide 18 extends from a first longitudinal end 54*a* to a second longitudinal end 54*b*, and is configured as a metal rail attached to the closet frame 3 by screws 24. The bottom guide 18 comprises an upper guide track 26, for guiding the lower end of the inner sliding door 12 (FIG. 1), and a lower guide track 28 for guiding the lower end of the outer sliding door 14. Each of the guide tracks 26, 28 has a respective guide track opening 30 facing in a horizontal direction perpendicular to the door planes P1, P2 (FIG. 1).

Figure 3:
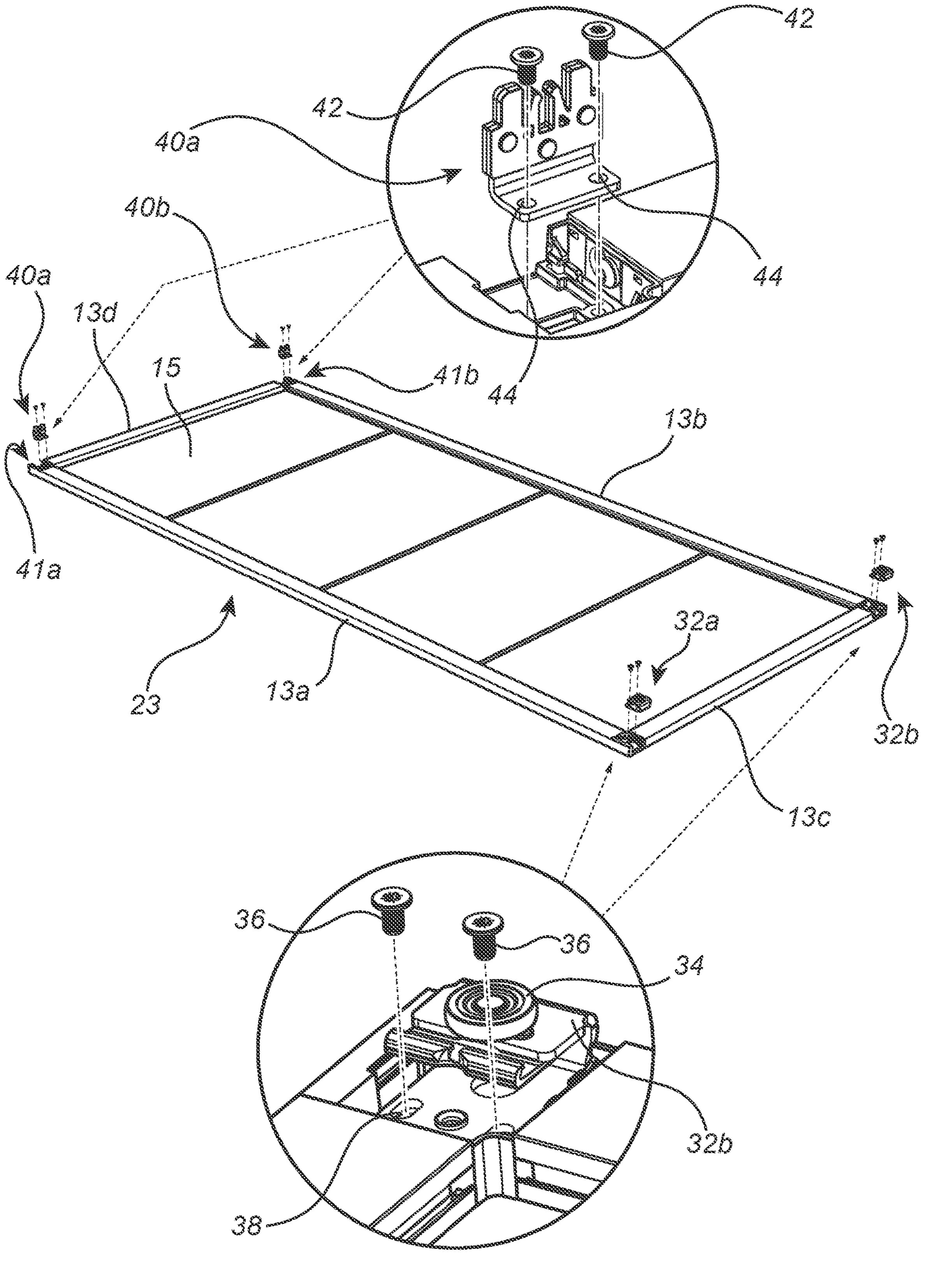
FIG. 3 is a view in perspective of a door leaf assembly comprising a door leaf, a pair of top riders, and a pair of shuttle connectors, wherein magnified portions illustrate the attachment of a top rider and a shuttle connector, respectively, to a door leaf of the door leaf assembly.

FIG. 3 illustrates components of the inner door leaf assembly. A pair of top riders, comprising a first top rider 32*a* and a second top rider 32*b*, are attached at respective top corners of the inner door leaf 23. Each top rider 32*a*, 32*b* comprises a guide wheel 34 configured to ride along a first, outer guide track (not illustrated) in the top guide 16 (FIG. 1). The respective top riders 32*a*, 32*b* are attached to the inner door leaf 23 by means of screws 36 penetrating elongate attachment and adjustment holes 38 of the top riders 32*a*, 32*b*. Similarly, a pair of shuttle connectors comprising a first shuttle connector 40*a* and a second shuttle connector 40*b*, the function of which will be elucidated in greater detail further below, are attached at respective bottom corners 41*a*, 41*b* of the door leaf 23. Also the respective shuttle connectors 40*a*, 40*b* are attached to the inner door leaf 23 by means of screws 42 penetrating screw holes 44 of the respective shuttle connectors 40*a*, 40*b*. Even though the screw holes 44 of the shuttle connectors in FIG. 3 are illustrated as being circular, it will be appreciated that they may alternatively have an elongate shape extending along the inner door plane P1 (FIG. 1), to enable adjusting the positions of the respective shuttle connectors 40*a*, 40*b* vis-à-vis the inner door leaf 23. It will be appreciated that the outer door leaf 25 (FIG. 1) may be assembled in a similar manner.

Figure 4:
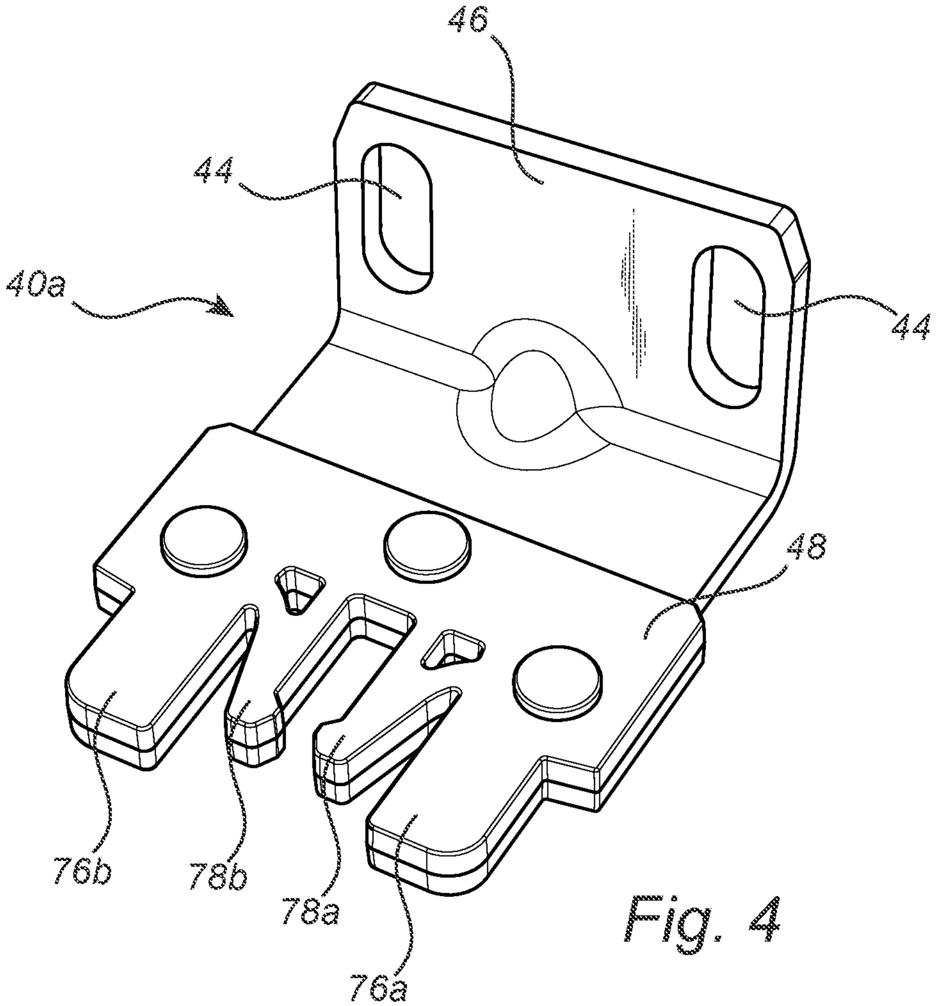
FIG. 4 is a perspective view of a shuttle connector of FIG. 3.

FIG. 4 illustrates the shuttle connector 40*a* in greater detail. The shuttle connector 40*a* is L-shaped, and comprises a door leaf mounting flange 46 configured to extend along the door plane P1 (FIG. 1) when attached to the inside face 15 of the door leaf 23 (FIG. 3), and a connector tongue 48 extending substantially perpendicularly from the door leaf mounting flange 46, such that it will extend along a substantially horizontal plane when the shuttle connector 40*a* is attached to the door leaf 23 (FIG. 3), and the inner door leaf 23 is in the upright position illustrated in FIG. 1.

Figure 5:
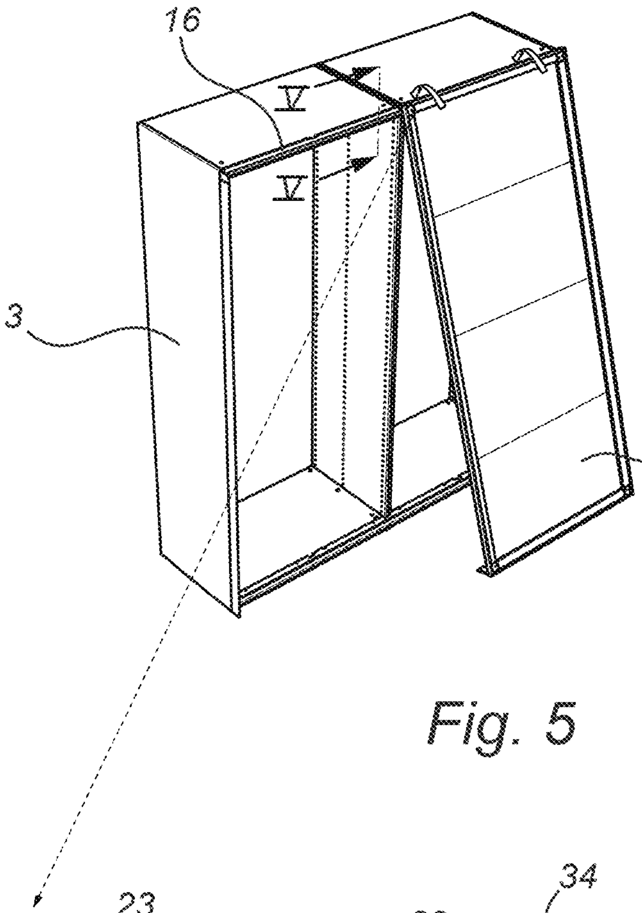
FIG. 5 is a view in perspective of the closet frame of FIG. 2, illustrating the suspension of the door leaf of FIG. 3 in a top guide of the closet frame.
Figure 5A:
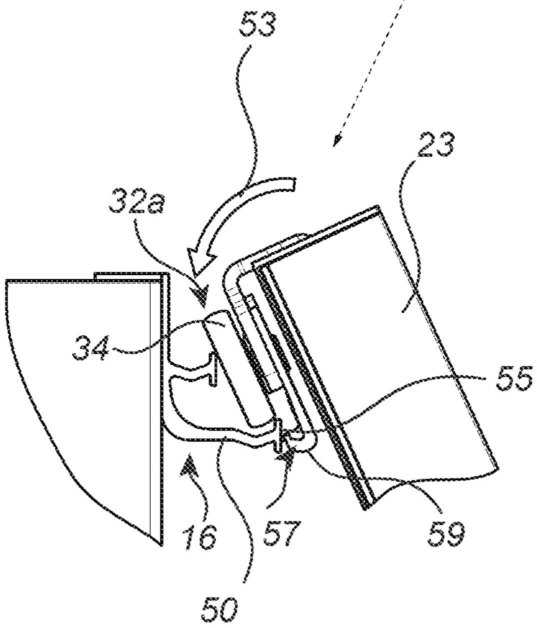
FIG. 5A illustrates a vertical section of the closet frame and door leaf of FIG. 5 during suspension of the door leaf in the top guide, the section taken along the line indicated by V in FIG. 5.
Figure 5B:
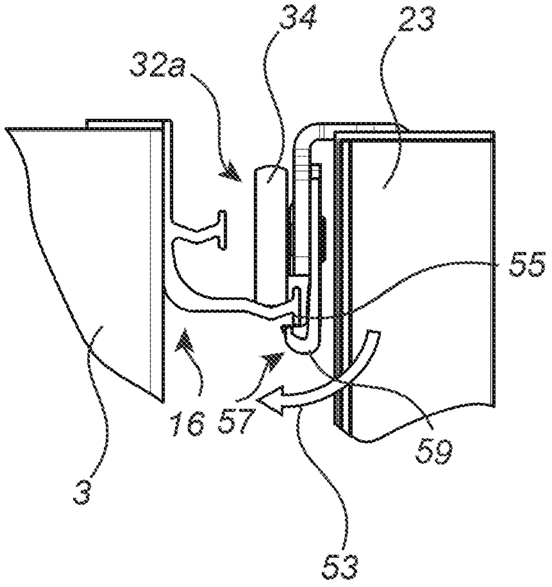
FIG. 5B illustrates a vertical section of the closet frame and door leaf of FIG. 5 after having suspended the door leaf in the top guide, the section taken along the line indicated by V in FIG. 5.

FIG. 5, along with the detail views of FIGS. 5A and 5B, illustrate how the inner door leaf 23 is hooked onto the top guide 16 by positioning the guide wheels 34 in a first, outer guide track 50 of the top guide 16, and pivoting the inner door leaf 23 in a lock direction 53 about a pivot axis S defined by the line of engagement between the top guide 16 and the guide wheels 34 of the top riders 32*a*, 32*b* (FIG. 3). Each of the top riders 32*a*, 32*b* (FIG. 3) comprises a resilient hook 59 which, when the inner door leaf 23 is pivoted in the lock direction 53, is pressed against and resiliently deformed by a lock portion 55 of the top guide 16. Once the hook 59 has passed the lock portion 55, it snaps back to its relaxed, non-deformed state, to lock the respective top rider 32*a*, 32*b* to the top guide 16. Thereby, the hook 59 defines a convenient snap arrangement 57 for snapping the respective top rider 32*a*, 32*b* to the top guide 16.

Should there be a need to disconnect the inner door leaf 23 from the top guide 16, the inner door leaf 23 can be pivoted in a release direction opposite to the lock direction 53. Thereby, the hook 59 will again be pressed against and resiliently deformed by the lock portion 55 of the top guide 16, and snap back to its relaxed, non-deformed state once having passed the lock portion 55 of the top guide 16.

After having suspended the inner door leaf 23 in the top guide 16, corresponding to the position of FIG. 5B, the top riders 32*a*, 32*b* (FIG. 3) lock the inner door leaf 23 to the top guide 16 such that the inner door leaf 23 can only be translated along a guide direction defined by the top guide 16; in particular, translation in a direction transversal to the inner door leaf plane P1 (FIG. 1) is prevented.

Figure 6:
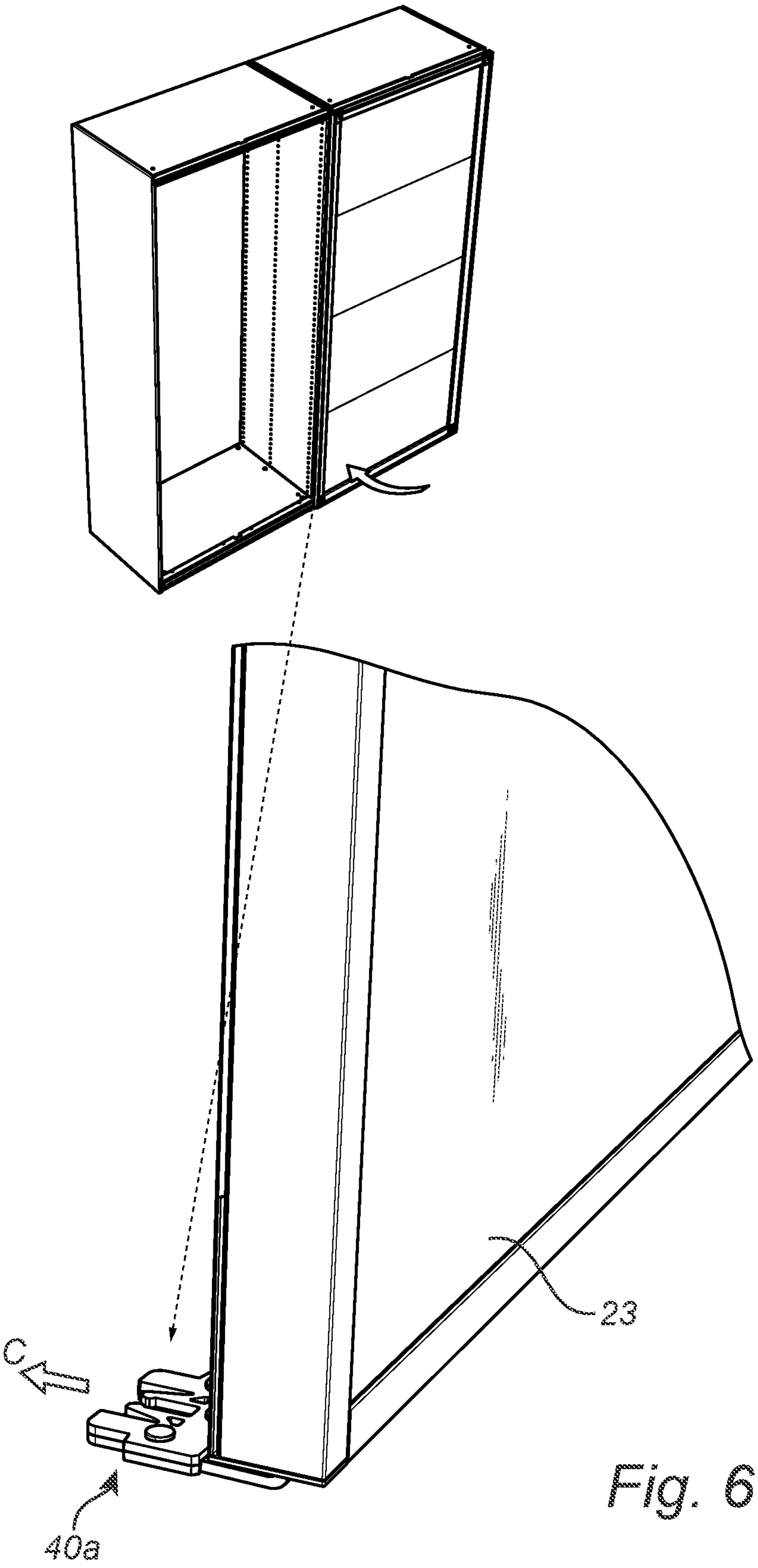
FIG. 6 is a view in perspective of the closet frame and door leaf of FIG. 5 after having suspended the door leaf on the closet frame, along with a magnified view of a lower portion of the door leaf.

At the end of the pivoting motion illustrated by the arrow in FIGS. 5A-5B, and now with reference to FIGS. 6A and 6B, the shuttle connectors 40*a*, 40*b* (FIG. 3) move in a horizontal connection direction C towards the bottom guide 18, to be connected to respective soft closing guide mechanism shuttles guided by the upper guide track of the bottom guide 18 (FIG. 2).

Figure 7:
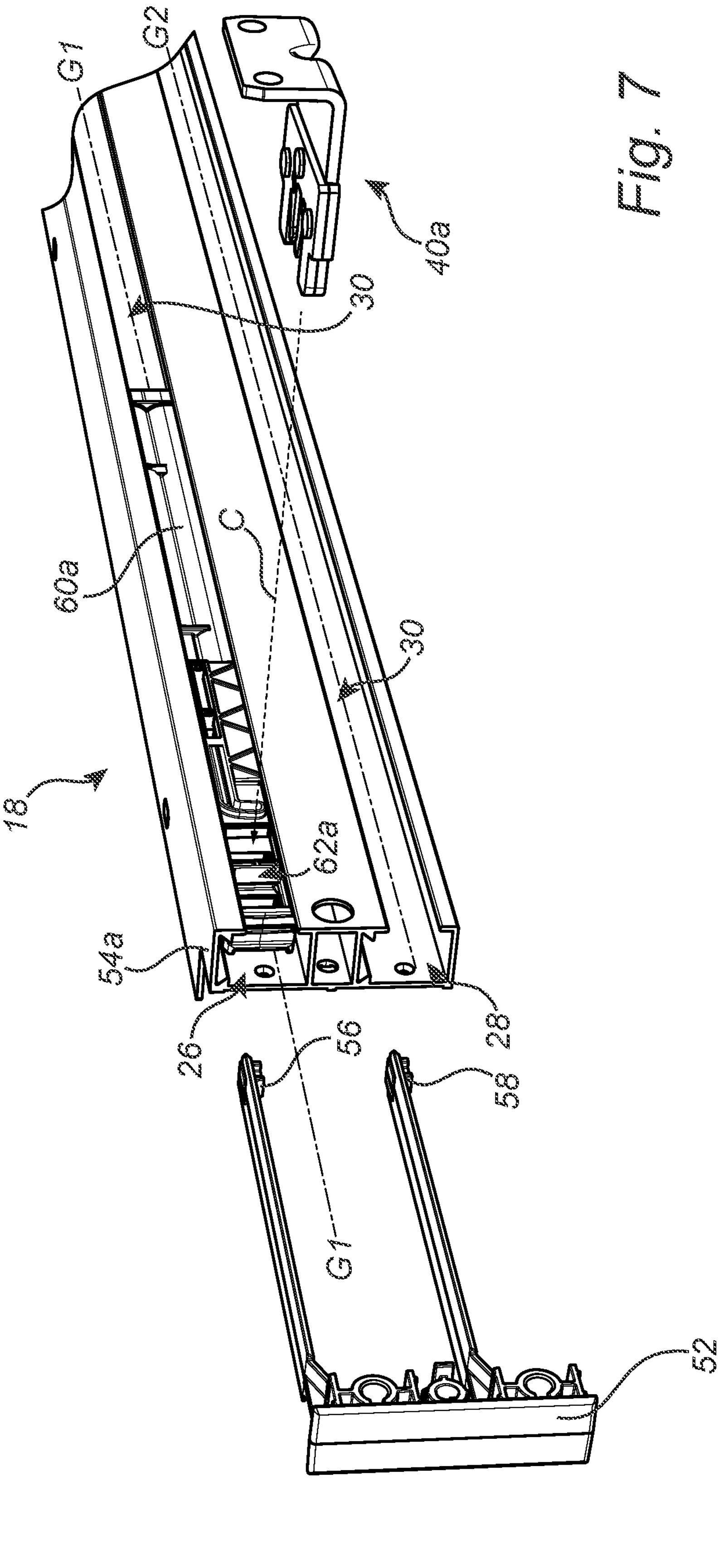
FIG. 7 is a partly exploded view of the shuttle connector of FIG. 4 and a portion of the bottom guide of FIG. 2, the bottom guide being provided with a soft closing mechanism shuttle.

The partly exploded view of FIG. 7 illustrates the bottom guide 18 together with the first shuttle connector 40*a*. The view of FIG. 7 more clearly illustrates the profile of the upper and lower guide tracks 26, 28, which are integrally formed within an extruded profile of the bottom guide 18, as well as their respective guide track openings 30. The upper guide track 26 defines an upper guide axis G1, and the lower guide track defines a lower guide axis G2, which is parallel to the upper guide axis G1. A plastic end-cap 52 is press-fit and/or screwed to the first longitudinal end 54*a* of the bottom guide 18. The end-cap 52 holds a first upper brake activator 56 in the upper guide track 26 at a predetermined distance from the first longitudinal end 54*a* of the bottom guide 18. The end-cap 52 also holds a first lower brake activator 58 in the lower guide track 28 a predetermined distance from the first longitudinal end 54*a* of the bottom guide 18. Each of the upper and lower guide tracks 26, 28 also comprises a respective dovetail arrangement 29 which firmly holds the respective brake activator 56, 58 in a fixed vertical position. This increases the stability of the brake activators 56, 58 also in the direction along the respective guide axes G1, G2, which may be useful e.g. in case the brake activators 56, 58 are made of a relatively soft material, such as plastic. It will be appreciated that similar, second, end-cap with second upper and lower brake activators may be arranged at the second end 54*b* (FIG. 2) of the bottom guide 18.

A first upper soft closing mechanism shuttle 60*a* is guided along the upper guide axis G1 within the upper guide track 26. The first upper soft closing mechanism shuttle 60*a* is configured to be connected to the inner door leaf 23 (FIG. 6) via the first shuttle connector 40*a* of the inner door leaf 23 (FIG. 6), to move with the inner door leaf 23 between end positions at the first and second longitudinal ends 54*a*, 54*b* of the bottom guide 18. Thereby, the first upper soft closing mechanism shuttle 60*a* guides the lower end of the inner door 12 along the upper guide axis G1. The first upper soft closing mechanism shuttle 60*a* is also configured to cooperate with the first upper brake activator 56, to engage a brake mechanism for gradually braking the motion of the door leaf when approaching the first longitudinal end 54*a* of the bottom guide 18.

In order to enable the connection between the inner door leaf 23 (FIG. 6) and the bottom guide 18, the first upper soft closing mechanism shuttle 60*a* is provided with a door leaf connector 62*a* configured to receive and engage with the first shuttle connector 40*a* of the inner door leaf 23 (FIG. 6), when the lower end of the door leaf 23 (FIG. 6) is moved in the connection direction C. The connection between the door leaf connector 62*a* of the first upper soft closing mechanism shuttle 60*a* and the first shuttle connector 40*a* of the inner door leaf 23 (FIG. 6) is made via the guide track opening 30 of the upper guide track 26, which guide track opening 30 extends along the length of the bottom guide 18. The upper guide track 26 further comprises a second upper soft closing mechanism shuttle (not illustrated), which is configured to be connected to the second shuttle connector 40*b* (FIG. 3) of the door leaf 23 in the same manner, such that both the lower corners 41*a*, 41*b* of the door leaf 23 (FIG. 3) become guided along the upper guide track 26 of the bottom guide 18. The second upper soft closing mechanism shuttle may be identical to the first upper soft closing mechanism shuttle 60*a*, but may be reflected about a plane perpendicular to the upper guide axis G1 so as to be oriented in the opposite direction along the upper guide axis G1, to cooperate with a respective brake activator at the second longitudinal end 54*b* (FIG. 2). First and second lower soft closing mechanism shuttles, identical to the first and second upper soft closing mechanism shuttles, may be arranged in the lower guide track 28 for guiding and soft closing of the outer door 14 (FIG. 1); however, for clarity of illustration, in FIG. 7, the bottom guide 18 is illustrated without any soft closing mechanism shuttle in the lower guide track 28.

Figure 8:
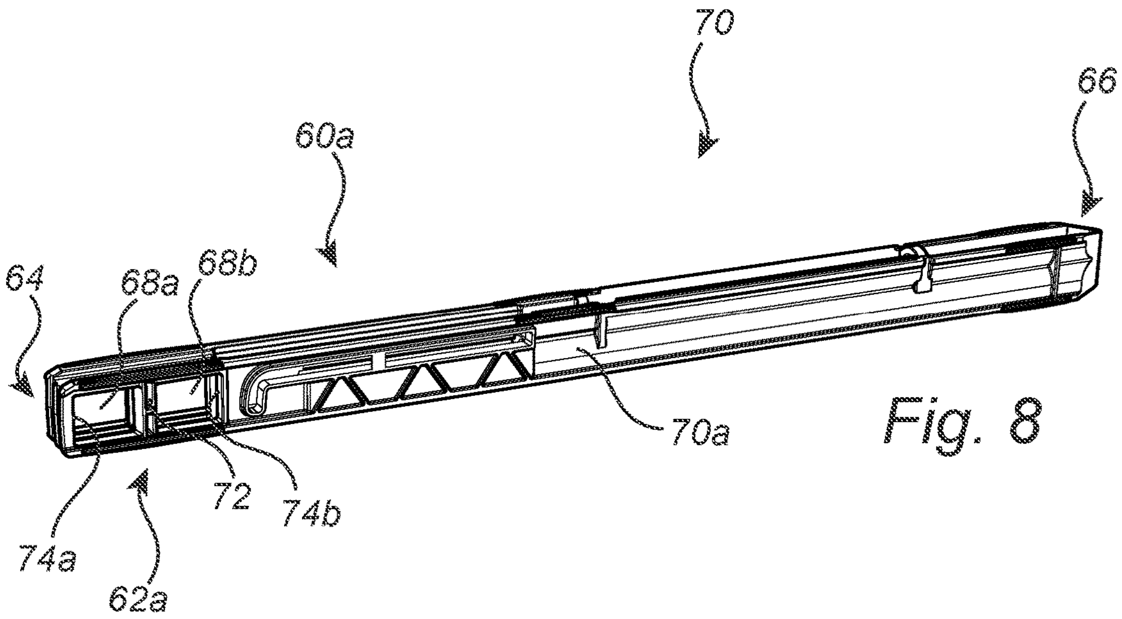
FIG. 8 is a perspective view of a housing of the soft closing mechanism shuttle of FIG. 7.

FIG. 8 illustrates a housing 70 of the first upper soft closing mechanism shuttle 60*a* (FIG. 7) in isolation. The first upper soft closing mechanism shuttle 60*a* has a door leaf connector end 64 facing the first longitudinal end 54*a* (FIG. 2) of the bottom guide 18, and a damping arrangement end 66 facing the second longitudinal end 54*b* (FIG. 2) of the bottom guide 18. The door leaf connector end 64 is provided with the door leaf connector 62*a*. As is apparent from the view of FIG. 8, the door leaf connector 62*a* comprises a first socket aperture 68*a* and a second socket aperture 68*b*. The two socket apertures 68*a*, 68*b* are configured as through-holes extending from a first side face 70*a* of the first upper soft closing mechanism shuttle 60*a* to a second, opposite side face of the first upper soft closing mechanism shuttle 60*a*, which second side face is not visible in the view of FIG. 8. The two socket apertures 68*a*, 68*b* are separated by a divider post 72. The axial extent, along the upper guide axis G1, of the first socket aperture 68*a* is delimited on one side by a first support wall 74*a*, and the axial extent of the second socket aperture 68*b* is delimited on the opposite side by a second support wall 74*b*.

Figure 9:
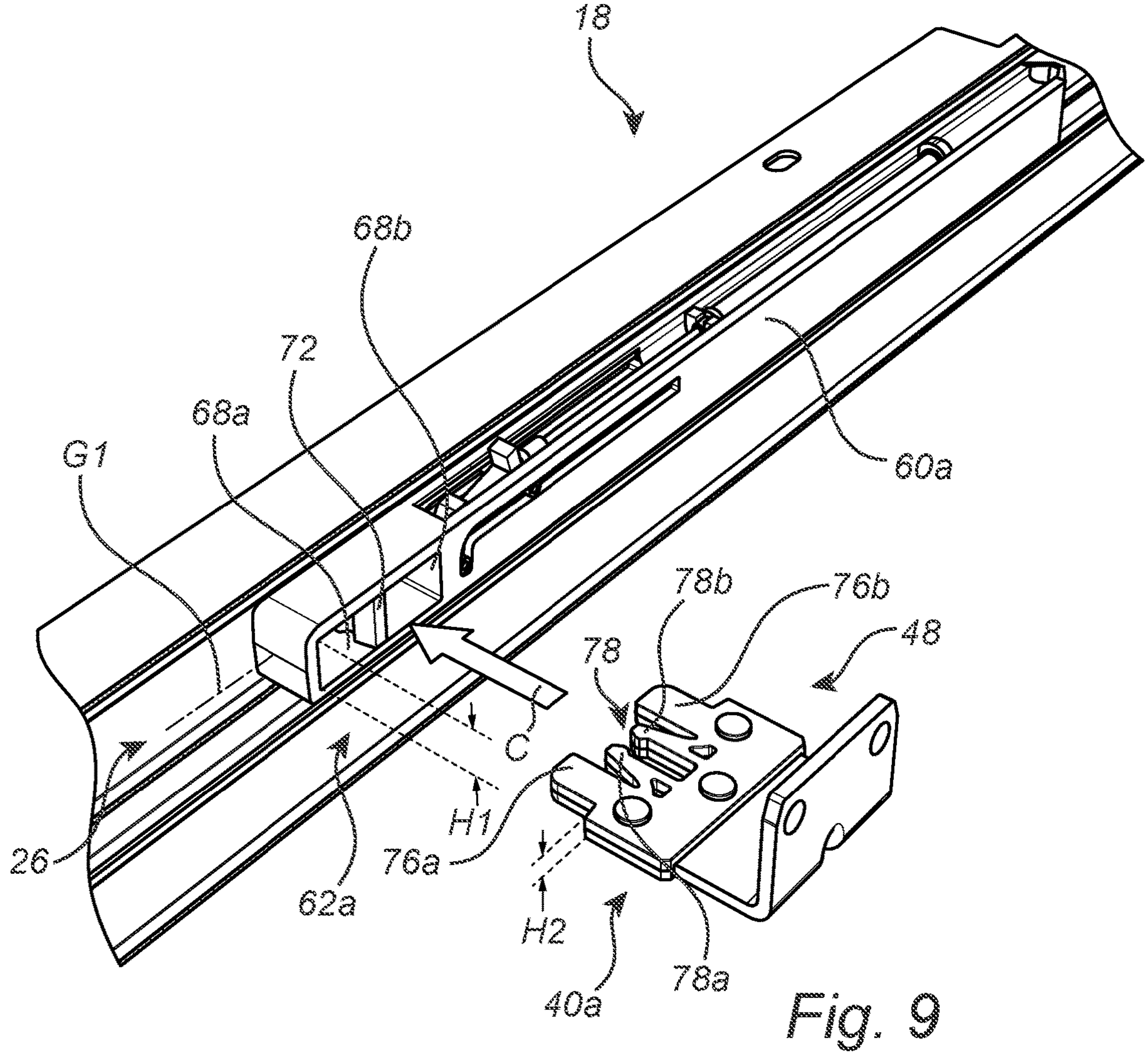
FIG. 9 is a perspective view of a portion of the bottom guide of FIG. 2, with parts of the bottom guide broken away to expose the soft closing mechanism shuttle therein, along with the shuttle connector of FIG. 4, and illustrates the connection of the shuttle connector to a door leaf connector of the soft closing mechanism shuttle.

Now turning to FIG. 9, the connector tongue 48 of the first shuttle connector 40*a* comprises a first support tongue 76*a* configured to enter the first socket aperture 68*a*, a second support tongue 76*b* configured to enter the second socket aperture 68*b*, and a snap connector 78 comprising resilient snap tongues 78*a*, 78*b* configured to releasably engage with the divider post 72. When the connector tongue is pressed against the door leaf connector 62*a*, the snap tongues 78*a*, 78*b* are resiliently pressed apart by the divider post 72 in a horizontal direction along the upper guide axis G1, and spring back into engagement with a groove in the divider post.

Figure 10:
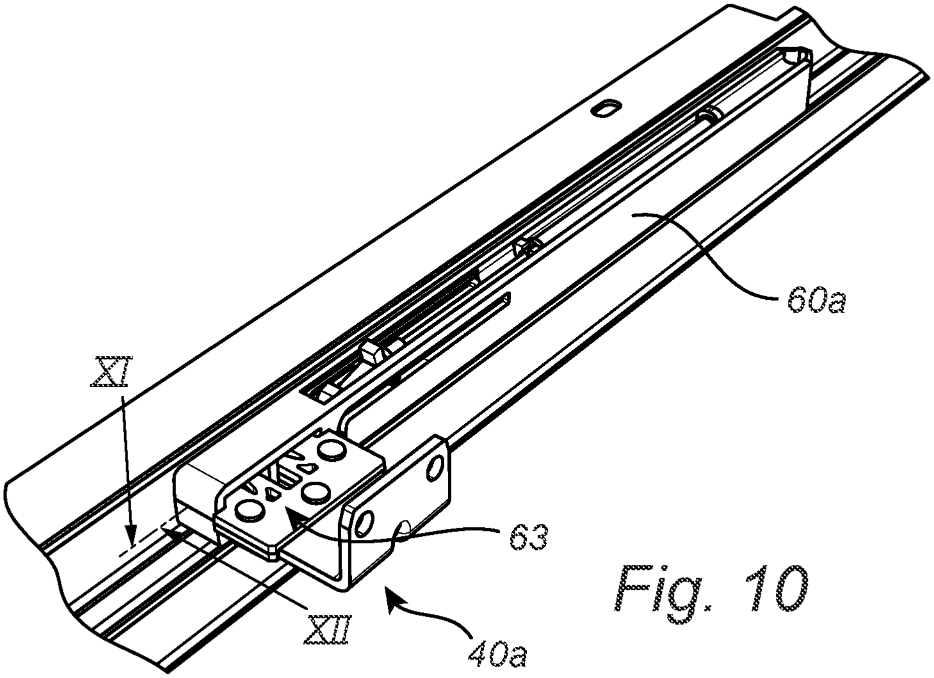
FIG. 10 is a perspective view of a portion of the bottom guide of FIG. 9, again with parts of the bottom guide broken away to expose the soft closing mechanism shuttle therein, along with the shuttle connector of FIG. 9, and illustrates the position of the shuttle connector after having been connected to the door leaf connector of the soft closing mechanism shuttle.

FIG. 10 illustrates the first shuttle connector 40*a* after having been connected to the door leaf connector 62*a* (FIG. 9) of the first upper soft closing mechanism shuttle 60*a*.

Figure 11:
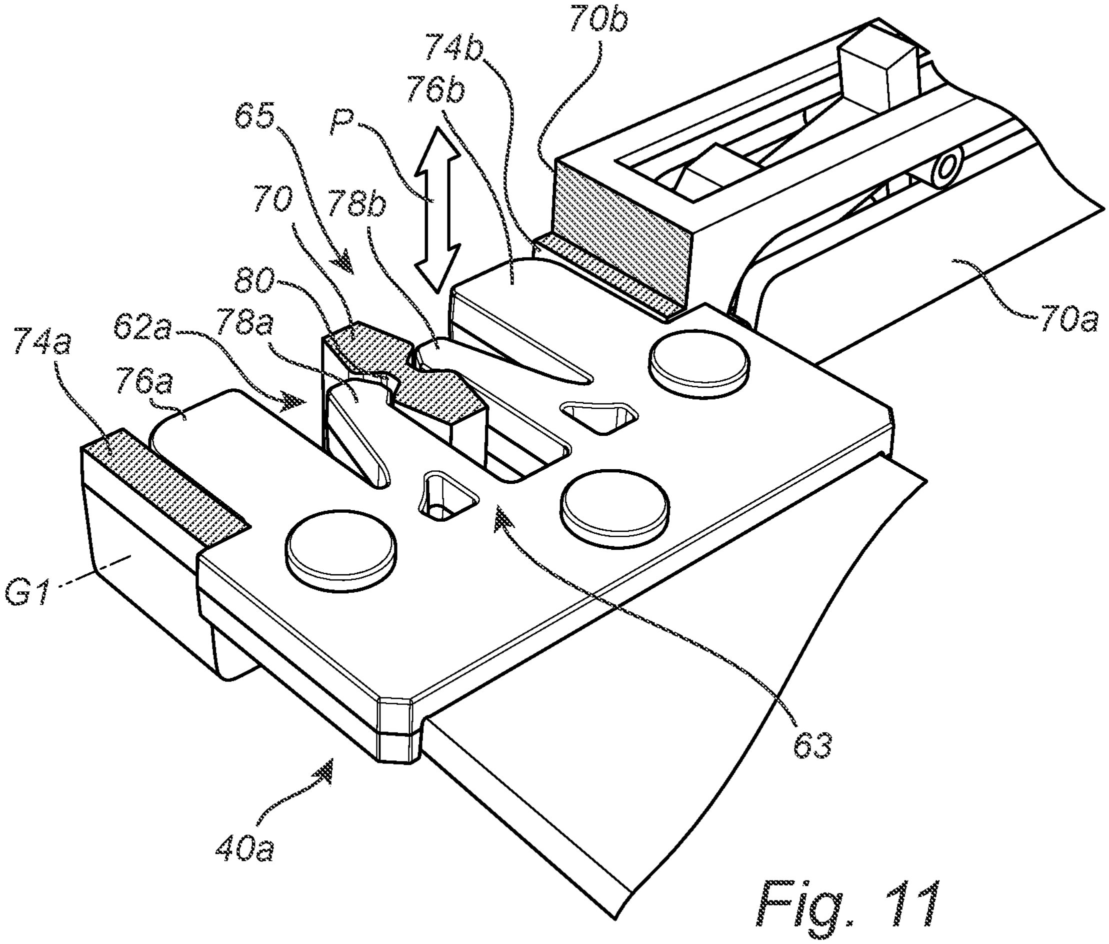
FIG. 11 is a perspective view of a section of the connected door leaf connector and shuttle connector of FIG. 10, the section taken along a horizontal plane indicated by the line XI in FIG. 10.

As is apparent from the magnified section view of FIG. 11, which section is taken along a horizontal plane indicated by the line XI in FIG. 10, the snap tongues 78*a*, 78*b* have sprung into engagement with respective grooves 80 on opposite sides of the divider post 72. The grooves 80 extend along the full inner height H1 of the socket apertures 68*a*,

68*b* (FIG. 8). Furthermore, the first support wall 74*a* of the first socket aperture 68*a* (FIG. 9) provides a rigid axial support, in a first direction along the upper guide axis G1, for the first support tongue 76*a*, and the second support wall 74*b* of the second socket aperture 68*b* (FIG. 9) provides a rigid axial support, in a second, opposite direction along the upper guide axis G1, for the second support tongue 76*b*. Thereby, the snap tongues 78*a*, 78*b* do not need to carry any substantial load along the upper guide axis G1 that may occur in the connection between the first shuttle connector 40*a* and the door leaf connector 62*a* of the first upper soft closing mechanism shuttle 60*a*. A vertical play P in the connection between the shuttle connector 40*a* and the door leaf connector 62*a* enables the shuttle connector 40*a* to attach to the door leaf connector 62*a* at any of a range of mutual vertical relationships.

FIG. 11 also illustrates that the door leaf connector 62*a* is functionally symmetric to allow connecting the first shuttle connector 40*a* at either of the side faces 70*a*, 70*b* of the first upper soft closing mechanism shuttle 60*a*. Expressed differently, the door leaf connector defines two connector interfaces 63, 65 facing in opposite directions. Thereby, an identical article may be used also for the second upper soft closing mechanism shuttle (not illustrated), by rotating the soft closing mechanism shuttle 60*a* 180° about a vertical axis and connecting the second shuttle connector (FIG. 3) from the other side, i.e. to the connector interface 65.

Figure 12A:
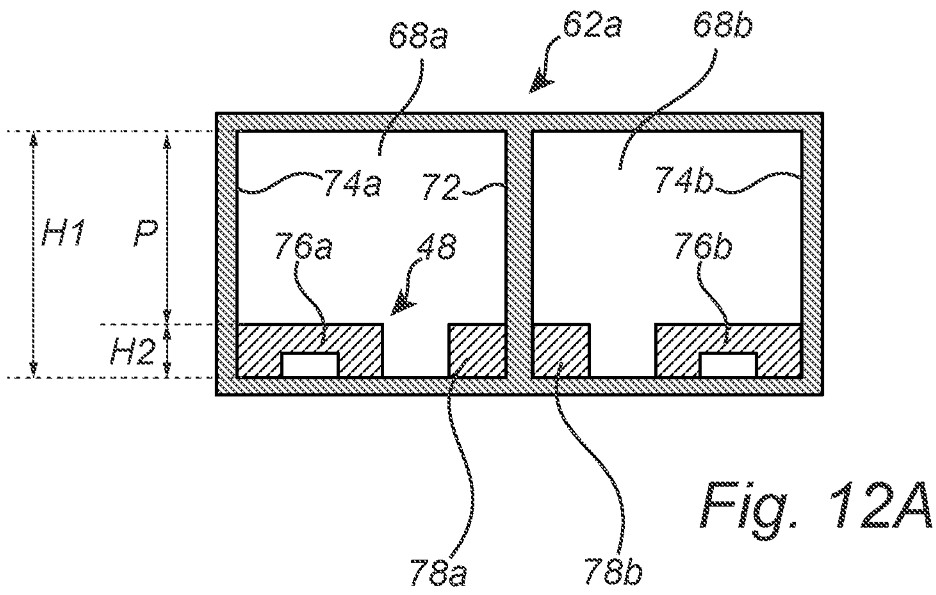
FIG. 12A is a perspective view of a section of the connected door leaf connector and shuttle connector of FIG. 10, the section taken along a vertical plane indicated by the line XII in FIG. 10, wherein the shuttle connector and door leaf connector are in a first mutual vertical relationship.
Figure 12B:
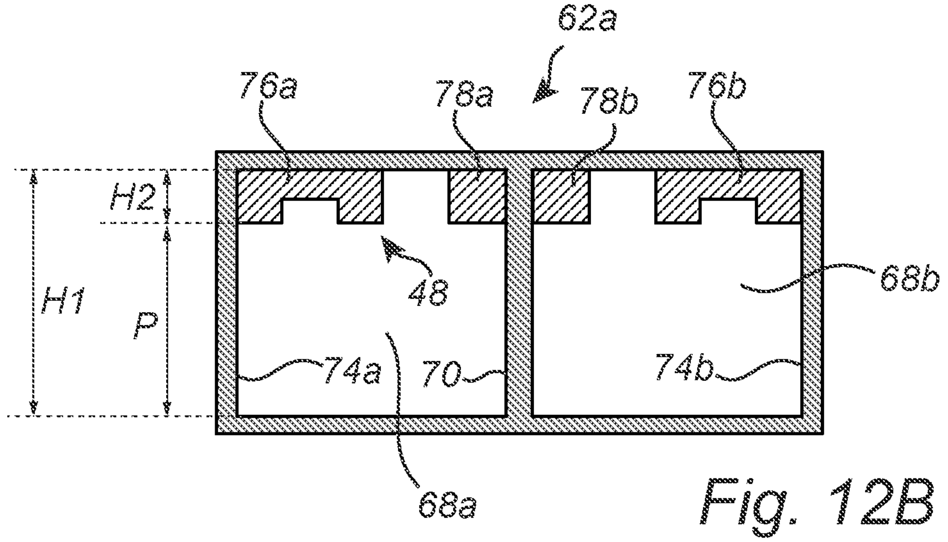
FIG. 12B is a perspective view of a section of the connected door leaf connector and shuttle connector of FIG. 10, the section taken along a vertical plane indicated by the line XII in FIG. 10, wherein the shuttle connector and door leaf connector are in a second mutual vertical relationship.

FIGS. 12A and 12B illustrate a vertical section of the interface between the door leaf connector 62*a* and the connector tongue 48, the section taken along the line XII indicated in FIG. 10. The inner height H1 of the socket apertures 68*a*, 68*b* is greater than the outer height H2 of the connector tongue 48, to permit a vertical play P=H1−H2 of the connector tongue 48 in relation to the door leaf connector 62*a* when connected thereto. Thereby, the first shuttle connector 40*a* is connectable to the door leaf connector 62*a* of the upper soft closing mechanism shuttle 60*a* at anyone of a continuous range of mutual vertical relationships, the range determined by the vertical play P. FIG. 12A illustrates the connector tongue 48 in a first, lowermost, position relative to the door leaf connector 62*a*, whereas FIG. 12B illustrates the connector tongue 48 in a second, uppermost, position relative to the door leaf connector 62*a*. The vertical play P allows the first guide track 50 of the top guide 16 (FIG. 5A) to diverge slightly, for example due to manufacturing tolerances, from the upper guide axis G1 defined by the upper guide track 26 of the bottom guide 18 (FIG. 7), without the door 12 (FIG. 12) getting jammed when moving along the door plane P1. Moreover, the vertical play P enables adjusting the vertical position of the inner door leaf 23 (FIG. 4B) relative to the closet frame (FIG. 4B) by moving the top riders 32*a*, 32*b* (FIG. 3) within the adjustment range permitted by the elongate screw holes 38. The door position can be adjusted prior to suspending the inner door 12 in the top guide 16, as described with reference to FIGS. 4A-4B; after suspending the inner door 12; or even after having connected the shuttle connectors 40*a*, 40*b* (FIG. 3) to the respective soft closing mechanism shuttles. An exemplary suitable play P=H1−H2 may exceed 3 mm. In the illustrated example, H1 is about 10 mm and H2 is about 3 mm, resulting in a vertical play of about 7 mm. It may be preferred that the play H1−H2 be less than 50 mm, in order to keep the size of the connectors within reasonable dimensions.

Figure 13A:
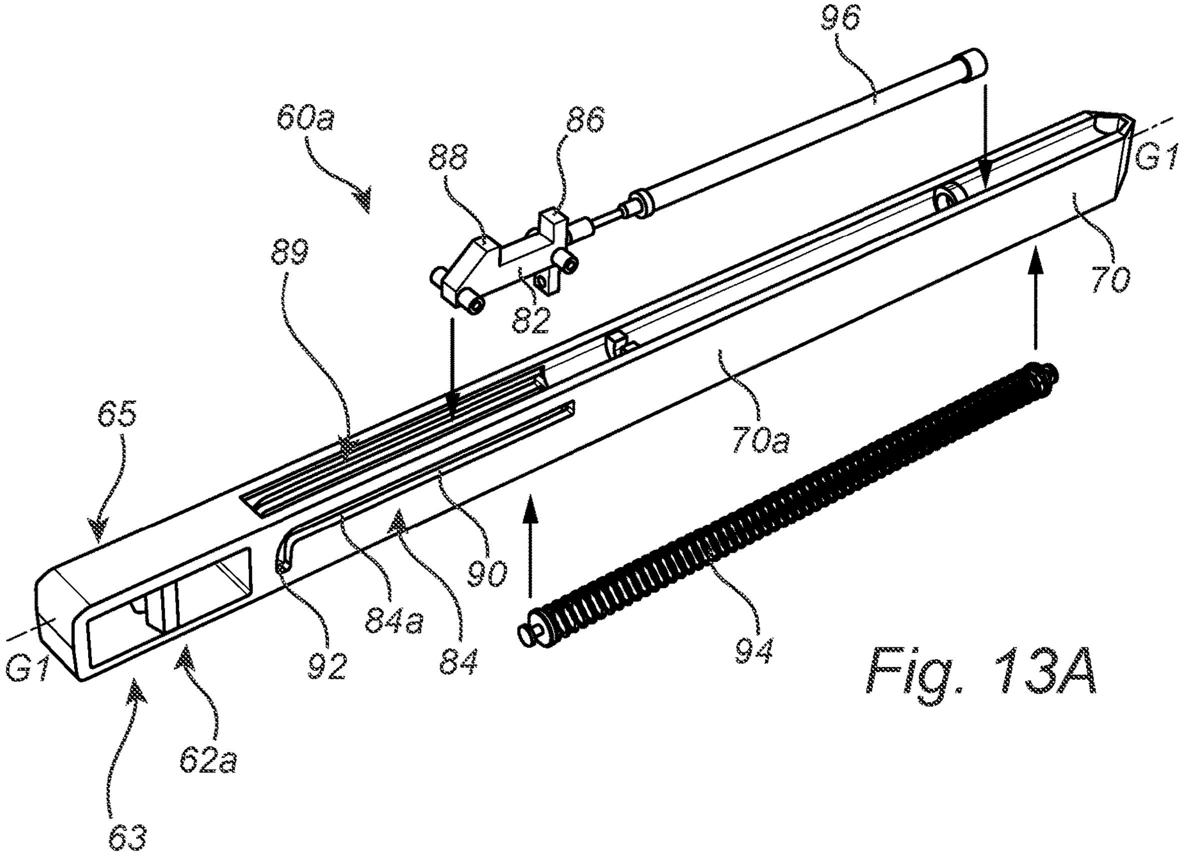
FIG. 13A is an exploded view of the soft closing mechanism shuttle of FIG. 9 as seen from a first perspective.
Figure 13B:
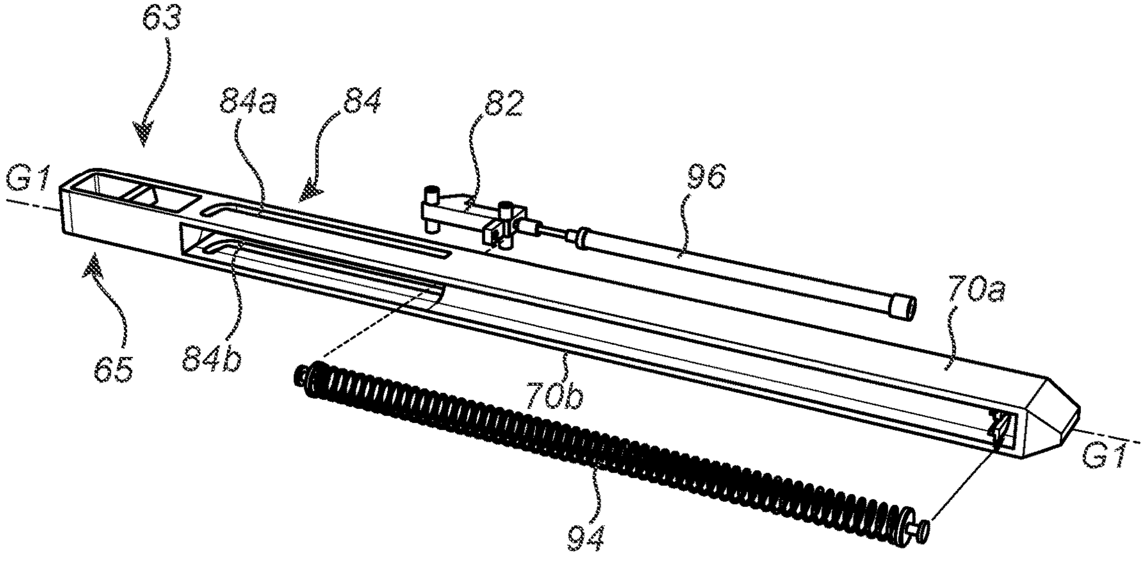
FIG. 13B is an exploded view of the soft closing mechanism shuttle of FIG. 9 as seen from a second perspective.

FIGS. 13A and 13B are exploded views of the first upper soft closing mechanism shuttle 60*a* as seen from two different perspectives. The first upper soft closing mechanism shuttle 60*a* comprises a catcher carriage 82 provided with an activator catcher 86 and an activator retainer 88, each of which protrude from the first upper soft closing mechanism shuttle 60*a* via an activator access track 89 extending axially along the top face of the first upper soft closing mechanism shuttle 60*a*. The catcher carriage 82 is movable along and guided by a carriage guide arrangement 84 comprising a pair of carriage guides 84*a*, 84*b*, which are formed alongside each other in the opposite side faces 70*a*, 70*b* of the housing 70 of the first upper soft closing mechanism shuttle 60*a*. The carriage guide arrangement 84 comprises a straight portion 90, which extends parallel to the upper guide axis G1, and a curved latch portion 92 adjacent to the door leaf connector 62*a*. The catcher carriage 82 is shaped and guided such that when at the straight portion 90, both the activator catcher 86 and the activator retainer 88 protrude from the first upper soft closing mechanism shuttle 60*a* via the activator access track 89 sufficiently to engage with the brake activator 56 (FIG. 7) of the upper guide track 26 (FIG. 2). However, when in the latch portion 92, the catcher carriage 82 assumes a partly retracted position, in which only the activator catcher 86 protrudes from the first upper soft closing mechanism shuttle 60*a* sufficiently to engage with the first upper brake activator 56 (FIG. 7) of the upper guide track 26 (FIG. 2). The catcher carriage 82 is connected to the housing 70 of the first upper soft closing mechanism shuttle 60*a* via a spring 94, which biases the catcher carriage 82 away from the partly retracted position adjacent to the door leaf connector 62*a*, and via a damper 96, which damps the motion of the catcher carriage 82 along the carriage guide arrangement 84. Each of the spring 94 and the damper 96 has one end attached to the catcher carriage 82, and the other end firmly attached to the housing 70 of the first upper soft closing mechanism shuttle 60*a* adjacent to the damping arrangement end 66 thereof.

Figure 14A:
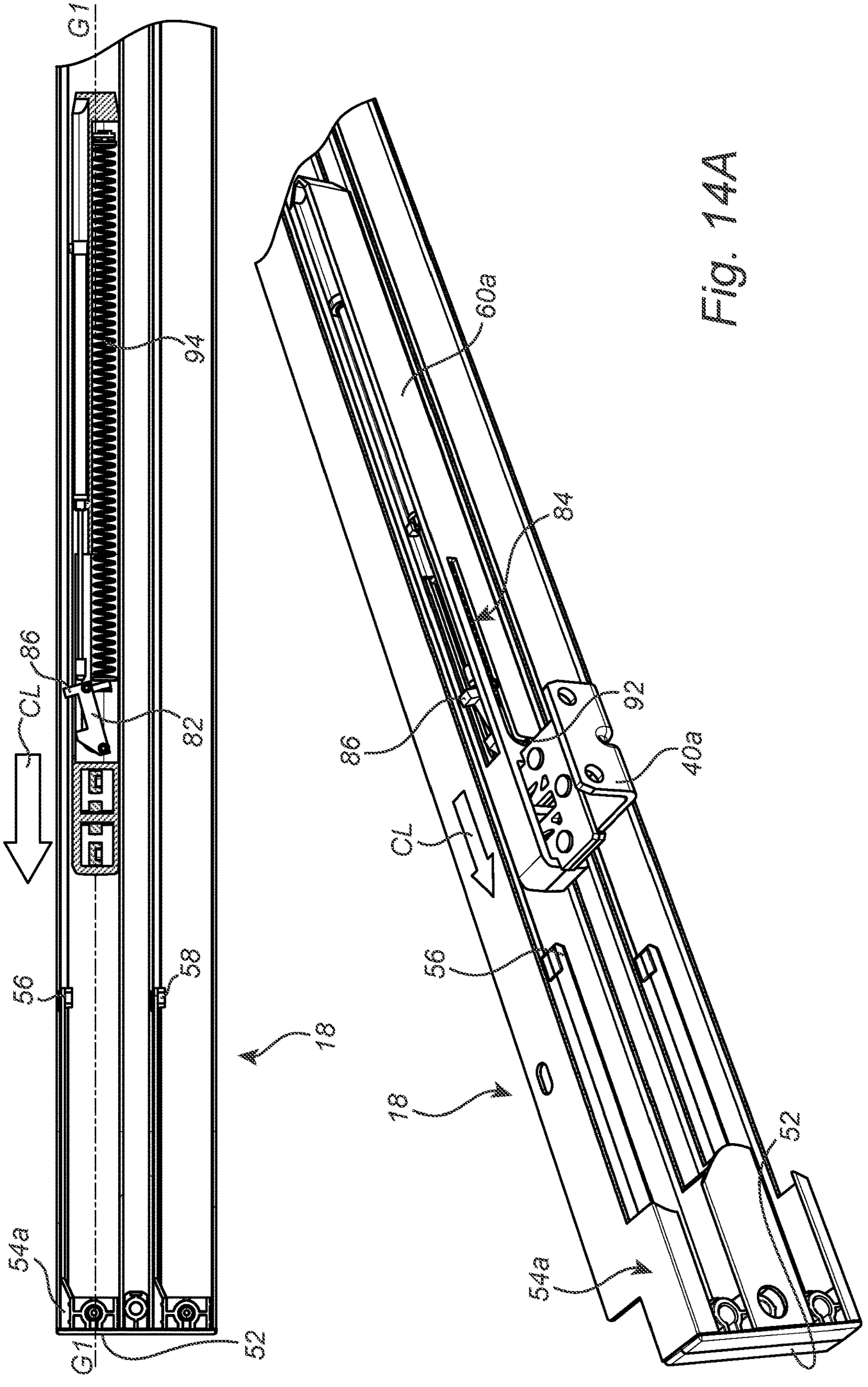
FIG. 14A illustrates, both in perspective and in a section along a vertical plane corresponding to that indicated by the line XII in FIG. 10, the bottom guide and soft closing mechanism shuttle of FIG. 9 in a first mutual position along a guide axis defined by the bottom guide, the position corresponding to the door being open, during closing of the door.
Figure 14B:
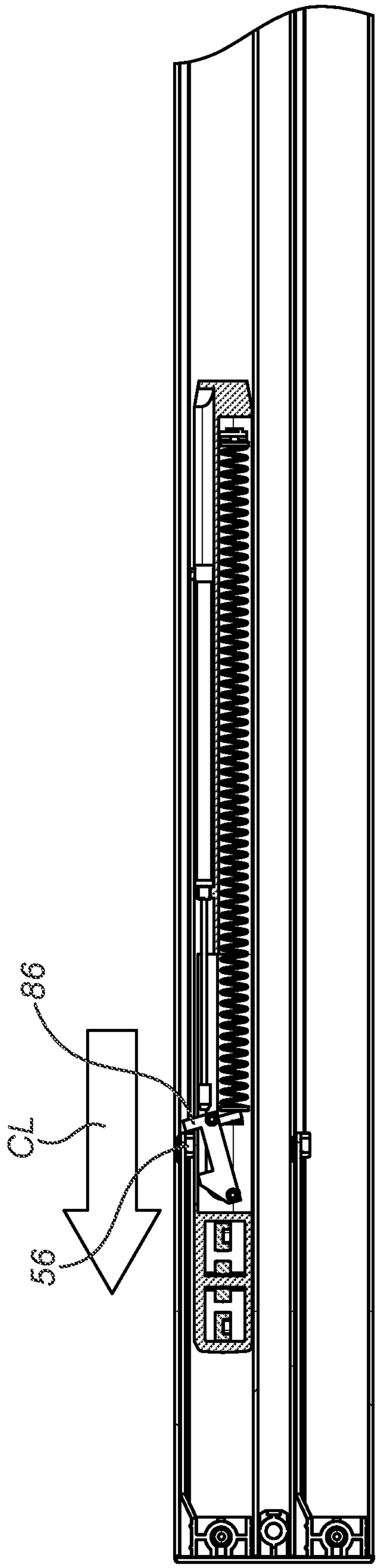
FIG. 14B illustrates, in a section along a vertical plane corresponding to that indicated by the line XII in FIG. 10, the bottom guide and soft closing mechanism shuttle of FIG. 14A in a second mutual position along the guide axis of the bottom guide during closing of the door.
Figure 14C:
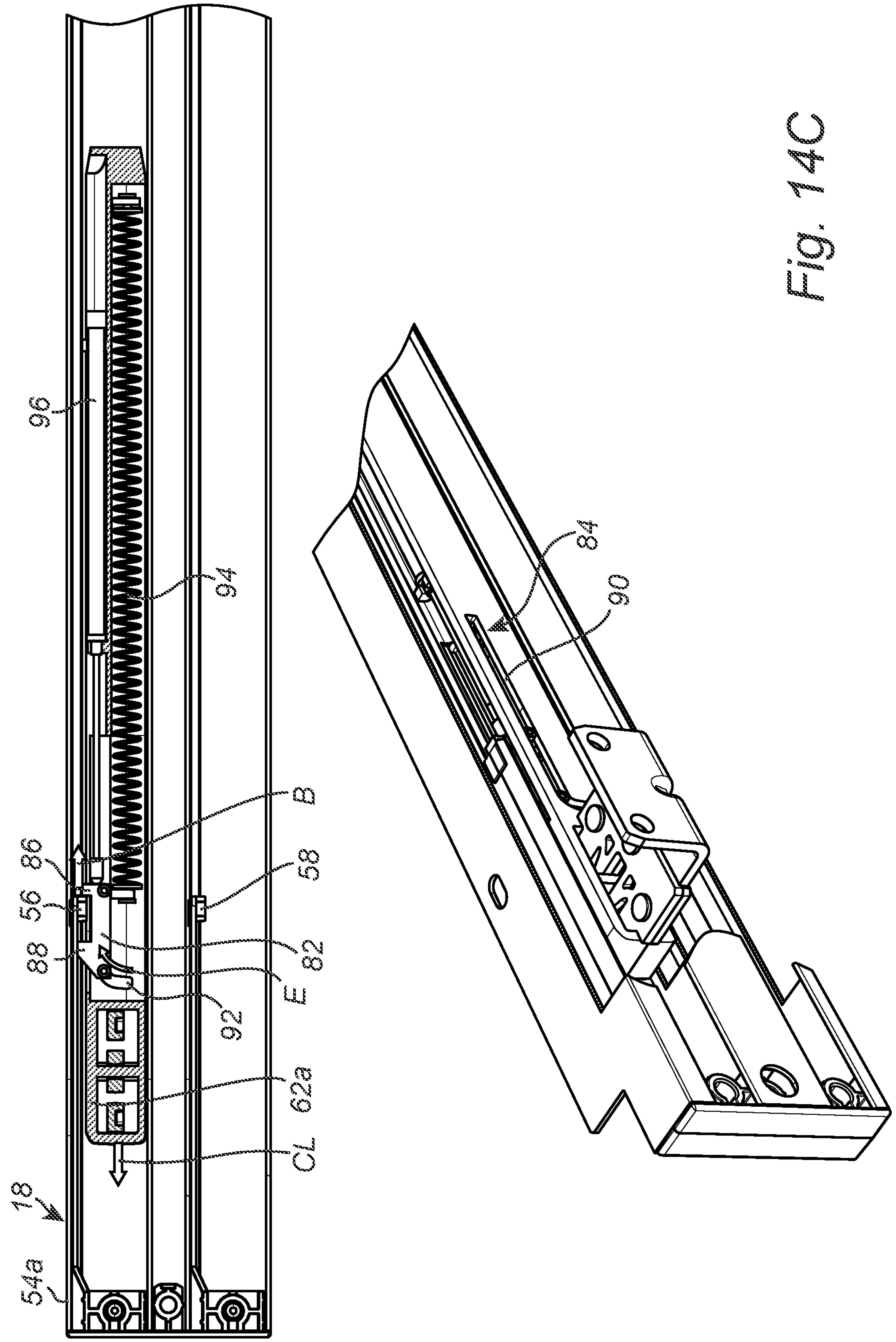
FIG. 14C illustrates, both in perspective and in a section along a vertical plane corresponding to that indicated by the line XII in FIG. 10, the bottom guide and soft closing mechanism shuttle of FIG. 14B in a third mutual position along the guide axis of the bottom guide, during closing of the door.
Figure 14D:
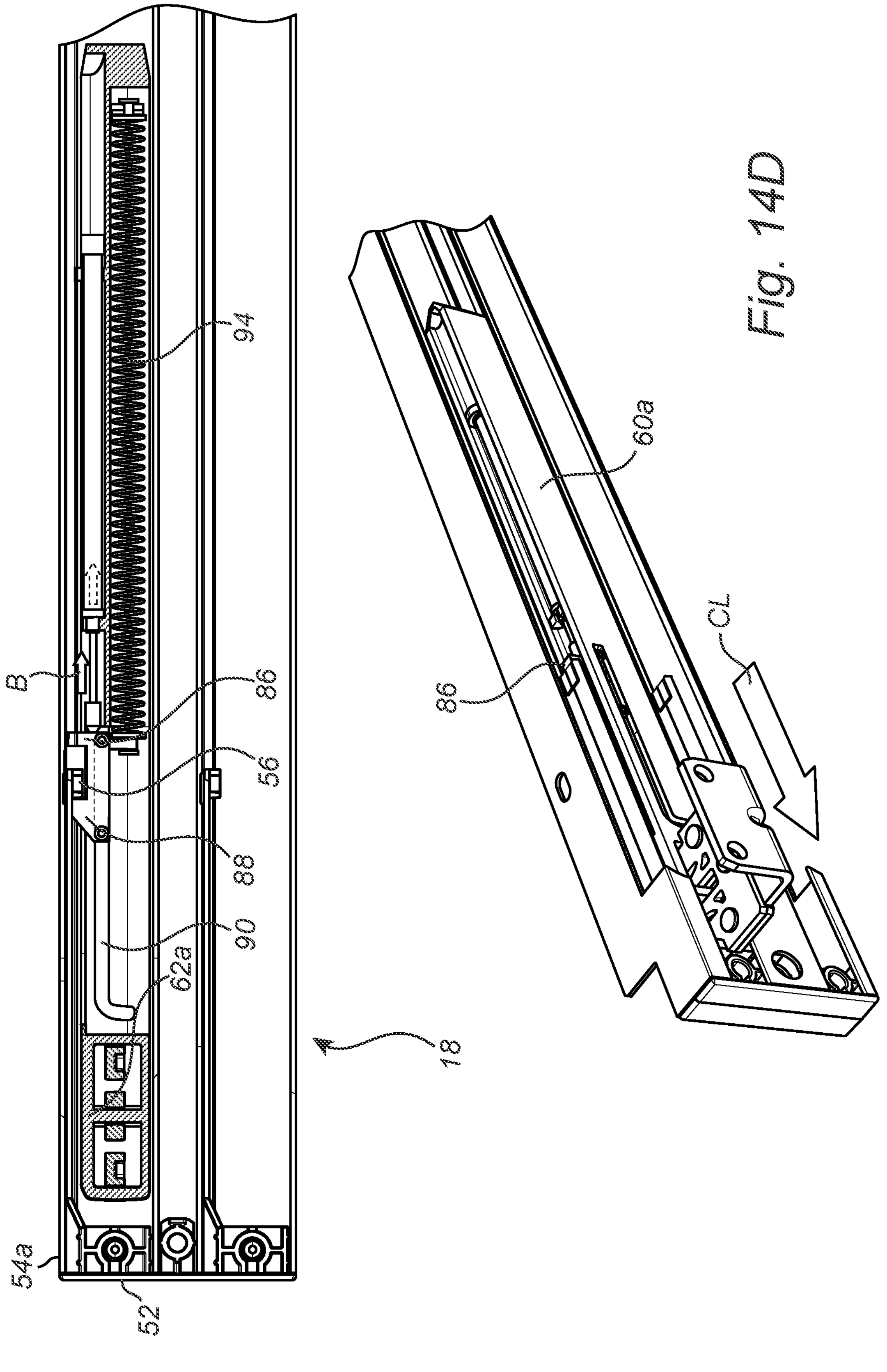
FIG. 14D illustrates, both in perspective and in a section along a vertical plane corresponding to that indicated by the line XII in FIG. 10, the bottom guide and soft closing mechanism shuttle of FIG. 14C in a fourth mutual position along the guide axis of the bottom guide, the position corresponding to a fully closed door.
Figure 14E:
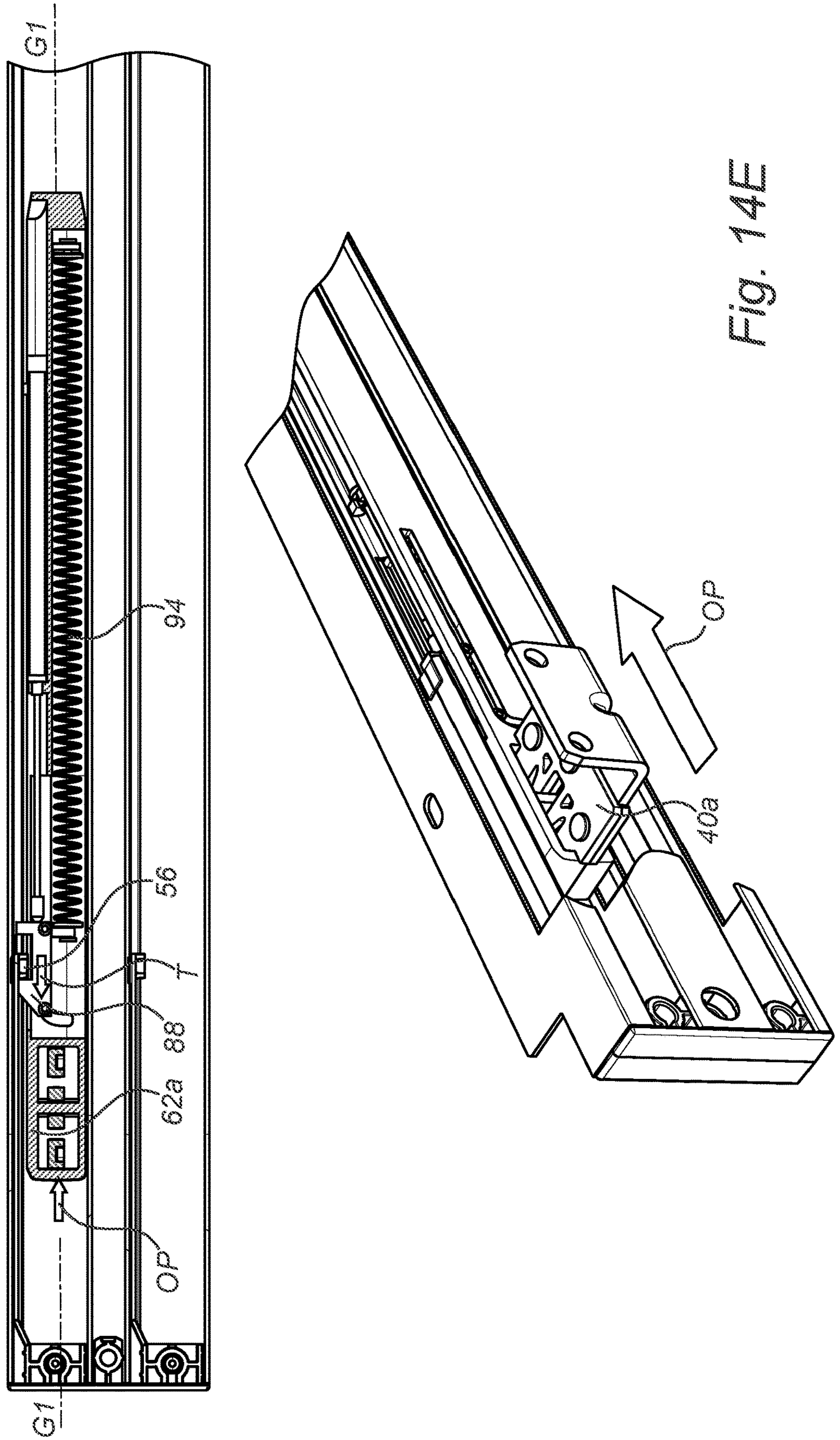
FIG. 14E illustrates, both in perspective and in a section along a vertical plane corresponding to that indicated by the line XII in FIG. 10, the bottom guide and soft closing mechanism shuttle of FIG. 14D in a fifth mutual position along the guide axis of the bottom guide, during opening of the door.
Figure 14F:
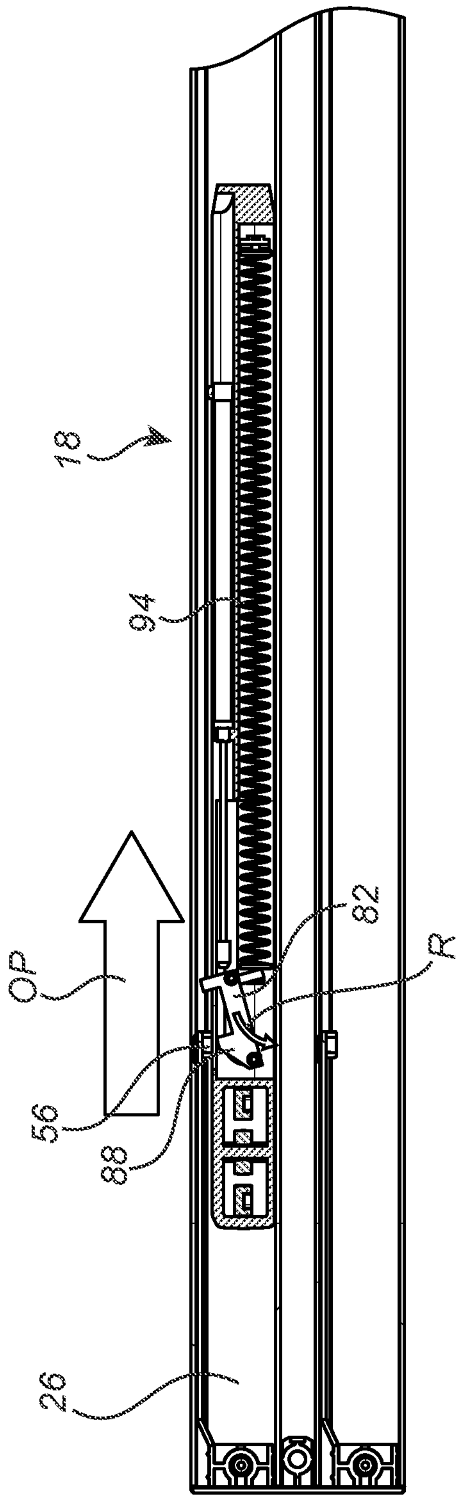
FIG. 14F illustrates, in a section along a vertical plane corresponding to that indicated by the line XII in FIG. 10, the bottom guide and soft closing mechanism shuttle of FIG. 14E in a sixth mutual position along the guide axis of the bottom guide, during opening of the door.

FIGS. 14A-14F illustrate the operation of the various components of the first upper soft closing mechanism shuttle 60*a* in a scenario where the inner door 12 (FIG. 1) is closed (FIGS. 14A-14D), and opened (FIGS. 14E-14F). For clarity of illustration, most instances of the FIGS. 14A-14F illustrate each respective position both in perspective and in a section taken along a vertical plane coinciding with the upper guide axis G1 indicated in e.g. FIG. 11, whereas FIGS. 14B and 14F illustrate the section only.

In the position of FIG. 14A, the door is open, and the catcher carriage 82 is trapped in the partly retracted position in the latch portion 92 of the carriage guide arrangement 84, such that the spring 94 is held in an extended/tensioned state by the trapped catcher carriage 82. The door leaf 23 (FIG. 1) is manually closed by moving it towards its first, leftmost, end position 11*a* as seen from the front, thereby bringing along the first upper soft closing mechanism shuttle 60*a* in a closing direction CL along the upper guide axis G1, towards the longitudinal end 54*a* of the bottom guide 18. Thereby, the catcher carriage 82 approaches the first upper brake activator 56. With the catcher carriage 82 in the partly retracted position, the activator catcher 86 protrudes upwards from the first upper soft closing mechanism shuttle 60*a* sufficiently to engage with the first upper brake activator 56, whereas the activator retainer 88 is sufficiently retracted to pass freely below the first upper brake activator 56.

FIG. 14B illustrates the moment when the activator catcher 86 engages with the first upper brake activator 56.

Now with reference to FIG. 14C, as the closing motion CL continues, the first upper brake activator 56 draws the catcher carriage 82 from the partly retracted position in the latch portion 92 of the carriage guide arrangement 84, into the straight portion 90 thereof. Thereby, the catcher carriage 82 pivots in an engage direction E, such that also the activator retainer 88 protrudes upwards from the first upper soft closing mechanism shuttle 60*a* sufficiently to engage with the first upper brake activator 56. In the position reached thereby, the first upper brake activator 56 is trapped between the activator catcher 86 and the activator retainer 88. The catcher carriage 82, now free to move along the straight portion 90 of the carriage guide arrangement 84, is drawn away from the door leaf connector 62*a* by the bias B of the spring 94, thereby pushing the door leaf connector 62*a*, and the door leaf 23 (FIG. 6), in the closing direction CL towards the first end 54*a* of the bottom guide 18. The motion is damped by the damper 96.

FIG. 14D illustrates the situation once the first upper soft closing mechanism shuttle 60*a* has reached its end position, the door leaf connector 62*a* resting against the end-cap 52 of the bottom guide 18. Remaining bias B in the spring 94 maintains a pressure between the activator retainer 88 and the first upper brake activator 56, thereby maintaining a pressure on the door leaf 23 (FIG. 6) in the closing direction CL towards the end position defined by the first end 54*a* of the bottom guide 18.

In FIG. 14E, the inner door 12 (FIG. 1) is opened, i.e. moved in an opening direction OP along the upper guide axis G1 away from the end position defined by the first end 54*a* of the bottom guide 18, towards the second end 54*b* thereof. Still, the first upper soft closing mechanism shuttle 60*a* follows the motion of the door 12 via the engagement between the door leaf connector 62*a* and the first shuttle connector 40*a*. The engagement between the first upper brake activator 56 and the activator retainer 88 moves the catcher carriage 82 in a spring tensioning direction T along the carriage guide arrangement 84, towards the door leaf connector 62*a*, thereby tensioning the spring 94, such that the door 12 has to be pushed in the opening direction OP against the bias of the spring 94.

Continuing to push the door in the opening direction OP, and now with reference to FIG. 14F, the catcher carriage 82 will reach the latch portion 92 of the carriage guide arrangement 84 (FIG. 13A), and pivot in a retraction direction R. Once in the retracted position, the activator retainer 88 disengages from the first upper brake activator 56, such that the first upper soft closing mechanism shuttle 60*a* can move freely along the upper guide track 26 of the bottom guide 18, together with the inner door 12 (FIG. 1). The bias of the spring 94 maintains the catcher carriage 82 locked in the partly retracted position until the next time the door 12 is closed, which would again bring us back to the situation of FIG. 14A.

Referring back to FIG. 2, the first upper soft closing mechanism shuttle 60*a* may be pre-mounted in the bottom door guide 18 prior to attaching the bottom guide 18 to the closet frame 3. Now referring to FIG. 7, in order to facilitate locating the first upper soft closing mechanism shuttle 60*a* for connection to the door leaf connector 40*a*, the first upper soft closing mechanism shuttle 60*a* may be pre-mounted at the first end 54*a* of the bottom guide, i.e. at the position of FIG. 14D. Thereby, the first upper soft closing mechanism shuttle 60*a* will be firmly held in a precisely determined position by the engagement between the first upper brake activator 56 and the activator catcher 86 and activator retainer 88 of the catcher carriage 82 (FIG. 14D). Connecting the first shuttle connector 40*a* of the door leaf 23 (FIG. 6) to the door leaf connector 62*a* of the first upper soft closing mechanism shuttle 60*a* would thereby imply, prior to connecting the two, moving the door 12 (FIG. 1) to the first end position 11*a* along the top guide (FIG. 1) to position the first shuttle connector 40*a* (FIG. 7) in alignment with the door leaf connector 62*a* of the first upper soft closing mechanism shuttle 60*a* (FIG. 7). As has been described hereinabove, the upper guide track 26 may further comprise a second upper soft closing mechanism shuttle (not illustrated), to be connected to the second shuttle connector 40*b* (FIG. 3) of the inner door leaf 23. The second upper soft closing mechanism shuttle may be pre-mounted at the second end 54*b* of the bottom guide 18 in the same manner, mutatis mutandis, such that for connecting the door leaf 23 (FIG. 1) to the two soft closing mechanism shuttles, the inner door is first moved to the first end position 11*a* for connecting to the first upper soft closing mechanism shuttle 60*a*, and then moved to the second end position 11*b* for connecting to the second upper soft closing mechanism shuttle. The second upper soft closing shuttle may be identical to, and operate in the very same manner as, the first upper soft closing mechanism 60*a*.

Figure 15:
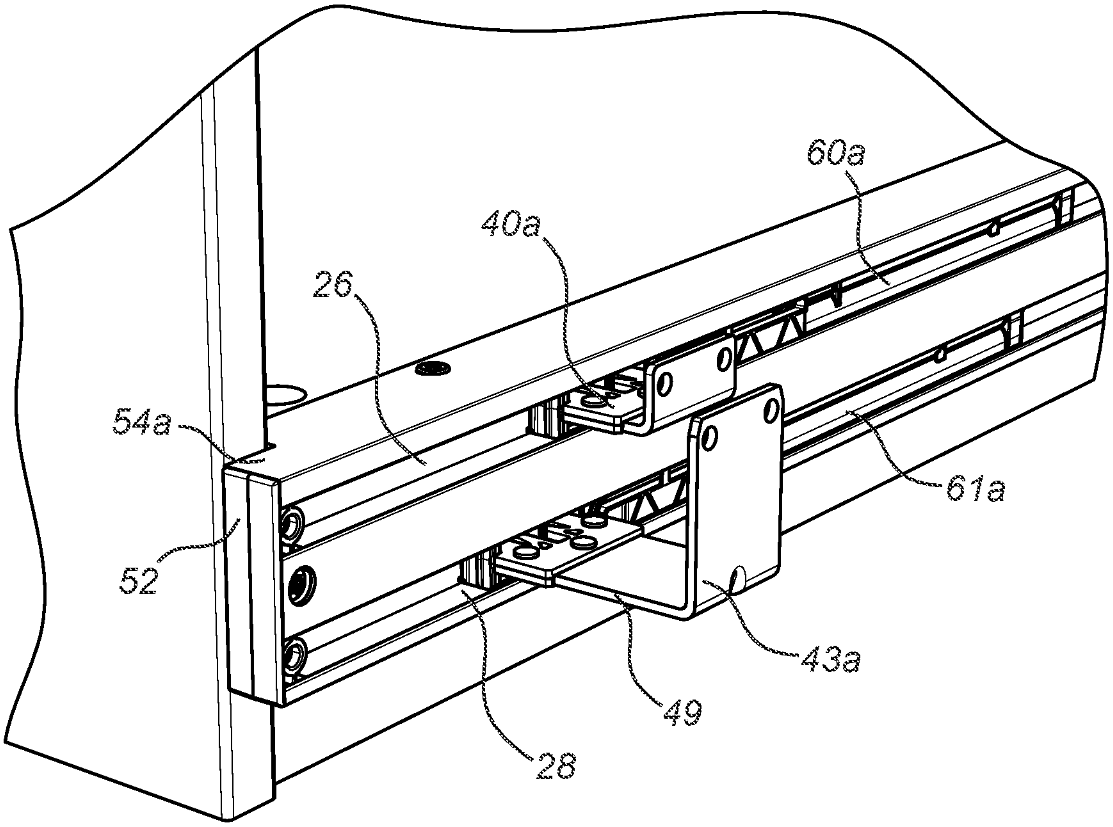
FIG. 15 is a perspective view of a lower portion of the closet of FIG. 1 after having suspended both doors onto the closet frame, wherein the door leaves have been broken away to expose the bottom guide and the shuttle connectors of the respective doors, along with a section corresponding to that of FIG. 5B, also after having suspended both doors onto the closet frame.
Figure 15:
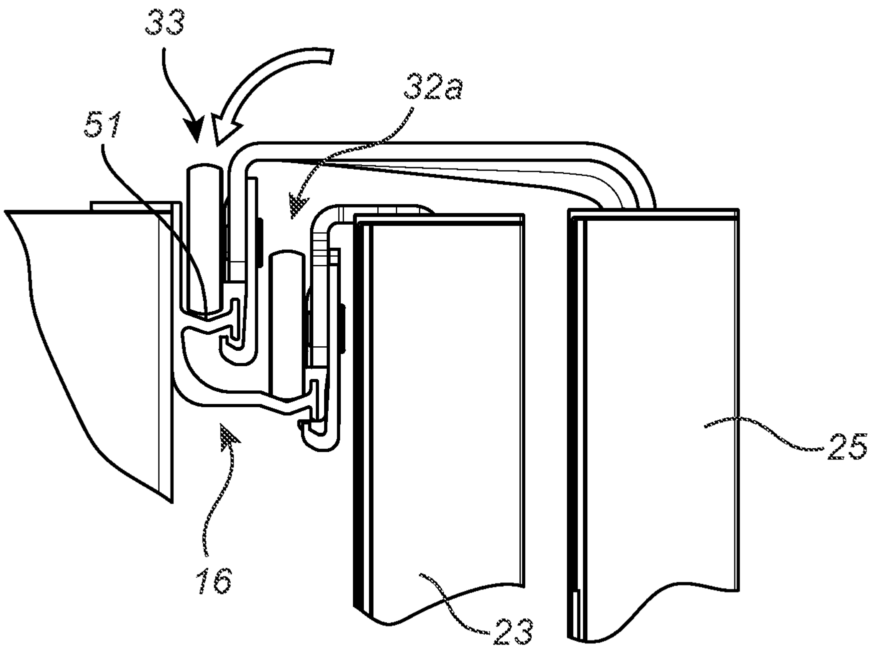

Now referring to FIG. 15, the lower guide track 28 of the bottom guide 18 may comprise a first lower soft closing mechanism shuttle 61*a* and a second lower soft closing mechanism shuttle (not illustrated), which lower soft closing mechanism shuttles may be identical to the first upper soft closing mechanism shuttle 60*a* in structure as well as function, for guiding respective bottom corners 41*a*, 41*b* (FIG. 3) of the outer door leaf 25 (FIG. 1). The outer door leaf 25 may be identical to the inner door leaf 23, but its shuttle connectors 43*a* may have somewhat longer connector tongues 49, to enable the outer door leaf 25 to freely move outside the inner door leaf 23 in a bypass manner. Similarly, and as is illustrated, the top riders 33 of the outer door leaf 25, riding in an upper/inner guide track 51 of the top guide 16, may also be somewhat extended for the same purpose.

The invention has mainly been described above with reference to a few embodiments. However, as is readily appreciated by a person skilled in the art, other embodiments than the ones disclosed above are equally possible within the scope of the invention, as defined by the appended patent claims.

For example, in the embodiments described in detail herein, the interface between the door leaf connector and the shuttle connector enables connecting the two at any mutual vertical position within a continuous range of mutual vertical positions. Alternatively, the door leaf connector and the shuttle connector may be configured to be connected to each other a limited number of discrete mutual positions, or at any of a plurality of separate, but continuous, sub-ranges. Moreover, a sliding closet door suspended in a designated closet frame, which may be positioned as a stand-alone closet within a room, has been described in detail hereinabove. However, the teachings herein are equally applicable to a sliding closet door guided in rails attached to the floor, ceiling, and/or walls of the room as such, for example in a so-called floor-to-ceiling installation. In the claims, the word "comprising" does not exclude other elements or steps, and the indefinite article "a" or "an" does not exclude a plurality.

The invention claimed is:

1. A sliding closet door assembly comprising:

a door leaf assembly configured to define a door leaf extending in a vertical door plane; and a door guide assembly configured to define a first door guide for guiding the door leaf between a first position and a second position along a horizontal guide axis along the door plane, wherein the first position is a first end position of the door leaf along the guide axis and the second position is a second end position of the door leaf along the guide axis, and the first door guide is configured to guide the door leaf from the second position to the first position, and wherein the first door guide is a bottom guide configured to guide a bottom edge of the door leaf; and a soft closing mechanism shuttle which is connectable to the door leaf to move with the door leaf between said first and second positions, guided by said first door guide, and to gradually brake the motion of the door leaf when approaching said first position, wherein the door leaf assembly comprises a shuttle connector configured to connect the door leaf to the soft closing mechanism shuttle, and the soft closing mechanism shuttle comprises a door leaf connector configured to engage with the shuttle connector of the door leaf assembly, wherein the shuttle connector is connectable to the door leaf connector at any one of at least a first mutual vertical relationship between the door leaf and the soft closing mechanism shuttle, and a second mutual vertical relationship between the door leaf and the soft closing mechanism shuttle; and wherein the first door guide comprises a guide track opening facing in a horizontal direction perpendicular to the guide axis, wherein the shuttle connector is connectable to the door leaf connector via the guide track opening.

2. The sliding closet door assembly according to claim 1, wherein the shuttle connector is at a first vertical position when the door leaf and the soft closing mechanism shuttle are in said first mutual vertical relationship, and at a second vertical position when the door leaf and the soft closing mechanism shuttle are in said second mutual vertical relationship.

3. The sliding closet door assembly according to claim 2, wherein a vertical distance between said first and second vertical positions exceeds 3 mm.

4. The sliding closet door assembly according to claim 1, wherein the shuttle connector is connectable to the door leaf connector at any mutual vertical relationship in a continuous range between said first mutual vertical relationship and said second mutual vertical relationship.

5. The sliding closet door assembly according to claim 1, wherein the shuttle connector is configured to be snap-fit to the door leaf connector.

6. The sliding closet door assembly according to claim 5, wherein the shuttle connector and the door leaf connector are configured to define, when connected, a guide support interface which is rigid in a direction of the guide axis.

7. The sliding closet door assembly according to claim 1, wherein the shuttle connector comprises a door leaf mounting flange configured to be attached to a face of the door leaf extending along the door plane, and a connector tongue extending substantially perpendicularly from the door leaf mounting flange, and/or wherein the door leaf connector comprises two connector interfaces facing in opposite directions.

8. The sliding closet door assembly according to claim 1, wherein said soft closing mechanism shuttle is pre-mounted in said first door guide, and/or wherein said soft closing mechanism shuttle is a first soft closing mechanism shuttle and said shuttle connector is a first shuttle connector, wherein the sliding closet door assembly further comprises a second soft closing mechanism shuttle which is connectable to the door leaf to move with the door leaf between said first and second positions, the second soft closing mechanism shuttle being configured to be guided by said first door guide, and to gradually brake the motion of the door leaf when approaching said second position, wherein the door leaf assembly further comprises a second shuttle connector configured to connect the door leaf to the second soft closing mechanism shuttle, and the second soft closing mechanism shuttle comprises a respective door leaf connector configured engage with the second shuttle connector of the door leaf assembly.

9. The sliding closet door assembly according to claim 1, wherein said first door guide comprises a brake activator adjacent to said first position, and said soft closing mechanism shuttle comprises an activator catcher configured to, when reaching the brake activator, engage with the brake activator to brake the door leaf.

10. The sliding closet door assembly according to claim 9, wherein the activator catcher is movable relative to the door leaf connector along the guide axis.

11. The bypass door assembly comprising two sliding closet door assemblies according to claim 1.

12. A sliding closet door assembly comprising a door leaf assembly configured to define a door leaf extending in a vertical door plane;

a door guide assembly configured to define a first door guide for guiding the door leaf between a first position and a second position along a horizontal guide axis along the door plane; and a soft closing mechanism shuttle which is connectable to the door leaf to move with the door leaf between said first and second positions, guided by said first door guide, and to gradually brake the motion of the door leaf when approaching said first position, wherein the door leaf assembly comprises a shuttle connector configured to connect the door leaf to the soft closing mechanism shuttle, and the soft closing mechanism shuttle comprises a door leaf connector configured engage with the shuttle connector of the door leaf assembly, wherein the shuttle connector is connectable to the door leaf connector at any one of at least a first mutual vertical relationship between the door leaf and the soft closing mechanism shuttle, and a second mutual vertical relationship between the door leaf and the soft closing mechanism shuttle;

wherein said first door guide comprises a brake activator adjacent to said first position, and said soft closing mechanism shuttle comprises an activator catcher configured to, when reaching the brake activator, engage with the brake activator to brake the door leaf;

wherein the activator catcher is movable relative to the door leaf connector along the guide axis; and wherein the activator catcher is configured to lock to the brake activator, and the activator catcher is resiliently biased relative to the door leaf connector along the guide axis to, once locked to the brake activator, bias the door leaf towards said first position.

13. A method of connecting a sliding door to a frame, the method comprising:

suspending the door in a top guide;

attaching the door to a soft closing mechanism shuttle guided by a bottom guide, the soft closing mechanism shuttle comprising a door leaf connector; and adjusting a vertical position of the door within a vertical adjustment range permitted by a vertical play in a connection interface between the door and the soft closing mechanism shuttle;

wherein a first door guide defined in a door guide assembly that is configured to guide the door between a first end position of the door and a second end position of the door along a horizontal guide axis along the door plane, comprises a guide track opening facing in a horizontal direction perpendicular to the guide axis, wherein the first door guide is configured to guide the door leaf from the second end position of the door to the first end position of the door, and wherein a shuttle connector that is configured to connect a door leaf to the soft closing mechanism shuttle, is connectable to the door leaf connector via the guide track opening.

14. A sliding closet door assembly comprising:

a door leaf assembly configured to define a door leaf extending in a vertical door plane; and a door guide assembly comprising a top guide for guiding a top edge of the door leaf to move between a first position and a second position along a horizontal guide axis along the door plane;

wherein the door leaf assembly comprises a pair of top riders which are connectable to the top guide;

wherein the top riders are configured to move with the door leaf along the top guide; and wherein the top riders comprise a snap arrangement configured to snap to the top guide via a pivotal motion of the door leaf in a lock direction about a horizontal pivot axis, thereby locking the door leaf to the top guide in such a manner that translation of the top edge of the door leaf in a direction transversal to the door plane is prevented.

15. The sliding closet door assembly according to claim 14, wherein the snap arrangement is configured to snap free from the top guide by pivoting the door leaf in a release direction about the pivot axis, the release direction being opposite to the lock direction.

16. The sliding closet door assembly according to claim 14, wherein each of said top riders comprises a respective guide wheel configured to ride along guide track in the top guide, wherein the pivot axis coincides with a line of engagement between the guide wheels and the guide track.

17. The sliding closet door assembly according to claim 14, wherein the snap arrangement comprises a hook configured to be pressed against and resiliently displaced by a lock portion of the top guide during said pivotal motion of the door leaf about the horizontal pivot axis, and to snap back to a relaxed state after having passed said lock portion to provide said snap function.

* * * * *